US012662555B2

(12) United States Patent
Neilson et al.

(10) Patent No.: US 12,662,555 B2
(45) Date of Patent: Jun. 23, 2026

(54) ATTENUATED HYBRID CATALYSTS

(71) Applicant: Dow Global Technologies LLC, Midland, MI (US)

(72) Inventors: Bethany M. Neilson, Manvel, TX (US); Roger L. Kuhlman, Lake Jackson, TX (US); Rhett A. Baillie, Pearland, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 594 days.

(21) Appl. No.: 17/995,866

(22) PCT Filed: May 26, 2021

(86) PCT No.: PCT/US2021/034144

§ 371 (c)(1),
(2) Date: Oct. 10, 2022

(87) PCT Pub. No.: WO2021/242801

PCT Pub. Date: Dec. 2, 2021

(65) Prior Publication Data

US 2023/0151127 A1 May 18, 2023

Related U.S. Application Data

(60) Provisional application No. 63/031,644, filed on May 29, 2020.

(51) Int. Cl.
*C08F 4/659* (2006.01)

(52) U.S. Cl.
CPC .................................... *C08F 4/659* (2013.01)

(58) Field of Classification Search
CPC ............................... C08F 4/651; C08F 4/6592
See application file for complete search history.

(56) References Cited

U.S. PATENT DOCUMENTS

| | | | |
|---|---|---|---|
| 3,709,853 | A | 1/1973 | Karapinka |
| 4,003,712 | A | 1/1977 | Miller |
| 4,011,382 | A | 3/1977 | Levine et al. |
| 4,302,566 | A | 11/1981 | Karol et al. |
| 4,453,399 | A | 6/1984 | Thompson |
| 4,543,399 | A | 9/1985 | Jenkins, III et al. |
| 4,588,790 | A | 5/1986 | Jenkins, III et al. |
| 4,665,208 | A | 5/1987 | Welborn, Jr. et al. |
| 4,874,734 | A | 10/1989 | Kioka et al. |
| 4,882,400 | A | 11/1989 | Dumain et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,968,827 | A | 11/1990 | Davis |
| 4,988,783 | A | 1/1991 | Beran et al. |
| 4,994,534 | A | 2/1991 | Rhee et al. |
| 5,091,352 | A | 2/1992 | Kioka et al. |
| 5,103,031 | A | 4/1992 | Smith, Jr. |
| 5,157,137 | A | 10/1992 | Sangokoya |
| 5,204,419 | A | 4/1993 | Tsutsui et al. |
| 5,206,199 | A | 4/1993 | Kioka et al. |
| 5,235,081 | A | 8/1993 | Sangokoya |
| 5,248,801 | A | 9/1993 | Sangokoya |
| 5,308,815 | A | 5/1994 | Sangokoya |
| 5,329,032 | A | 7/1994 | Tran et al. |
| 5,352,749 | A | 10/1994 | DeChellis et al. |
| 5,391,529 | A | 2/1995 | Sangokoya |
| 5,391,793 | A | 2/1995 | Marks et al. |
| 5,462,999 | A | 10/1995 | Griffin et al. |
| 5,541,270 | A | 7/1996 | Chinh et al. |
| 5,624,878 | A | 4/1997 | Devore et al. |
| 5,627,242 | A | 5/1997 | Jacobsen et al. |
| 5,648,310 | A | 7/1997 | Wasserman et al. |
| 5,665,818 | A | 9/1997 | Tilston et al. |
| 5,677,375 | A | 10/1997 | Rifi et al. |
| 5,688,880 | A | 11/1997 | Spencer et al. |
| 5,693,838 | A | 12/1997 | Sangokoya et al. |
| 5,919,983 | A | 7/1999 | Rosen et al. |
| 5,965,477 | A | 10/1999 | Sivaram et al. |
| 5,965,677 | A | 10/1999 | Stephan et al. |
| 5,972,510 | A | 10/1999 | O'Hare et al. |
| 6,034,187 | A | 3/2000 | Maehama et al. |

(Continued)

FOREIGN PATENT DOCUMENTS

| | | |
|---|---|---|
| CN | 1280999 | 1/2001 |
| EP | 0188914 | 7/1986 |

(Continued)

OTHER PUBLICATIONS

IUPAC's Compendium of Chemical Terminology. Gold Book, version 2.3.3, Feb. 24, 2014.

(Continued)

*Primary Examiner* — Vu A Nguyen

(57) ABSTRACT

A method of making an attenuated-light-off hybrid catalyst, the method comprising combining a faster-light-off catalyst with an effective amount of a kinetics modifier compound of formula ($A^1$), ($B^1$), or ($C^1$): $R^5—C≡C—R^6$ ($A^1$), $(R^5)_2C=C=C(R^6)_2$ ($B^1$), or $(R^5)(R^7)C=C(R^6)(R^7)$ ($C^1$) as defined herein under effective reaction conditions to give an attenuated hybrid catalyst that exhibits an attenuated light-off kinetics profile (relative to that of the faster-light-off catalyst); wherein the faster-light-off catalyst has been made by activating a hybrid precatalyst (i.e., an unactivated "coordination entity" or "ligand-metal complex") of structural formula (I): (Cp) $(L)_k(X)_x$ (I) as defined herein; and related methods, compositions and uses.

14 Claims, No Drawings

(56) References Cited

U.S. PATENT DOCUMENTS

| | | | |
|---|---|---|---|
| 6,083,339 | A | 7/2000 | Peters et al. |
| 6,127,495 | A | 10/2000 | Rosch et al. |
| 6,391,816 | B1 * | 5/2002 | McDaniel ............ B01J 31/2295 502/118 |
| 6,489,408 | B2 | 12/2002 | Mawson et al. |
| 6,803,339 | B2 | 10/2004 | Hall et al. |
| 6,872,844 | B2 | 3/2005 | Vogel |
| 6,967,184 | B2 | 11/2005 | Wenzel et al. |
| 7,041,757 | B2 | 5/2006 | Hall et al. |
| 7,705,157 | B2 | 4/2010 | Leclerc et al. |
| 7,873,112 | B2 | 1/2011 | Nakamura |
| 8,291,115 | B2 | 10/2012 | Bitterlich |
| 8,455,601 | B2 | 6/2013 | Kolb et al. |
| 8,609,794 | B2 | 12/2013 | Klosin et al. |
| 8,835,577 | B2 | 9/2014 | Rix et al. |
| 9,000,108 | B2 | 4/2015 | Klosin et al. |
| 9,029,487 | B2 | 5/2015 | Klosin et al. |
| 9,062,138 | B2 | 6/2015 | Ker et al. |
| 9,234,060 | B2 | 1/2016 | Kao et al. |
| 9,718,900 | B2 | 8/2017 | Giesbrecht |
| 11,459,409 | B2 | 10/2022 | Young et al. |
| 2003/0104927 | A1 * | 6/2003 | Hall ........................ C08F 10/00 502/118 |
| 2008/0051537 | A1 | 2/2008 | Carnahan et al. |
| 2009/0306323 | A1 | 12/2009 | Kolb et al. |
| 2010/0016527 | A1 | 1/2010 | Carnahan |
| 2013/0144018 | A1 | 6/2013 | Klosin et al. |
| 2015/0099856 | A1 * | 4/2015 | Hoang ................ C08F 4/65912 526/129 |
| 2017/0081444 | A1 | 3/2017 | Wang et al. |
| 2017/0101494 | A1 | 4/2017 | Fontaine et al. |
| 2017/0137550 | A1 | 5/2017 | Ewart et al. |
| 2018/0002464 | A1 | 1/2018 | Fontaine et al. |
| 2018/0079836 | A1 | 3/2018 | Locklear et al. |
| 2018/0282452 | A1 | 10/2018 | Fontaine et al. |
| 2018/0298128 | A1 | 10/2018 | Harlan et al. |

FOREIGN PATENT DOCUMENTS

| | | | | |
|---|---|---|---|---|
| EP | 0279586 | | 8/1988 | |
| EP | 0511665 | | 11/1992 | |
| EP | 0561476 | | 9/1993 | |
| EP | 0594218 | | 4/1994 | |
| EP | 634421 | | 1/1995 | |
| EP | 0649992 | | 4/1995 | |
| EP | 0748823 | | 12/1996 | |
| EP | 0767184 | | 4/1997 | |
| EP | 0794200 | | 9/1997 | |
| EP | 0802202 | | 10/1997 | |
| EP | 0802203 | | 10/1997 | |
| EP | 890581 | A1 * | 1/1999 | ................ C08F 4/64 |
| WO | 199410180 | | 5/1994 | |
| WO | 96/00734 | A1 | 1/1996 | |
| WO | 199947598 | | 9/1999 | |
| WO | 199948605 | | 9/1999 | |
| WO | 199950311 | | 10/1999 | |
| WO | 199960033 | | 11/1999 | |
| WO | 200063262 | | 10/2000 | |
| WO | 2006066126 | | 6/2006 | |
| WO | 2009064404 | | 5/2009 | |
| WO | 2009064452 | | 5/2009 | |
| WO | 2009064482 | | 5/2009 | |
| WO | 2011087520 | | 7/2011 | |
| WO | 2012027448 | | 3/2012 | |
| WO | 2013070601 | | 5/2013 | |
| WO | 2014105411 | | 7/2014 | |
| WO | 2016172097 | | 10/2016 | |
| WO | 2017058858 | | 4/2017 | |
| WO | 2017058981 | | 4/2017 | |
| WO | 2018022975 | | 2/2018 | |
| WO | 2018183056 | | 10/2018 | |
| WO | 2020055893 | | 3/2020 | |

OTHER PUBLICATIONS

PCT/US2021/034144, International Search Report and Written Opinion with a mailing date of Sep. 21, 2021.

* cited by examiner

ATTENUATED HYBRID CATALYSTS

Olefin polymerization catalysts, methods, and polyolefins made thereby.

INTRODUCTION

Publications and patents in the field include EP 0 188 914 A2; EP 0 748 823 A1; EP 1 778 738 A1; EP 2 121 776 A1; EP 2 609 123 A1; U.S. Pat. Nos. 5,624,878; 5,965,677; 6,083,339 B2; 6,967,184 B2; 7,705,157 B2; 8,455,601 B2; 8,609,794 B2; 8,835,577 B2; 9,000,108 B2; 9,029,487 B2; 9,234,060 B2; 9,718,900 B2; US 2009/0306323 A1; US 2017/0081444 A1; US 2017/0101494 A1; US 2017/0137550 A1; US 2018/0002464 A1; US 2018/0282452 A1; US 2018/0298128 A1; WO 2006/066126 A2; WO 2009/064404 A2; WO 2009/064452 A2; WO 2009/064482 A1; WO 2011/087520 A1; WO 2012/027448; WO 2013/070601 A2; WO 2014/105411 A1; WO 2016/172097 A1; WO 2017/058858; WO 2017/058981 A1; WO 2018/022975 A1; WO 2020/055893 A1; and WO 2018/183026 A1.

Among others, U.S. Pat. No. 8,609,794 B2; U.S. Pat. No. 9,000,108 B2; U.S. Pat. No. 9,029,487 B2; US 2017/0081444 A1; US 2017/0101494 A1; US 2017/0137550 A1; US 2018/0002464 A1; US 2018/0282452 A1; WO 2017/058858; and WO 2018/022975 A1 are assigned to Dow Global Technologies LLC, a subsidiary of The Dow Chemical Company, and describe biphenylphenoxy-type (BPP-type) precatalysts and catalysts, their syntheses, and their use in olefin polymerization reactions.

U.S. Pat. No. 6,967,184 B2 is issued to Timothy T. Wenzel ("Wenzel") and U.S. Pat. No. 9,718,900 B2 is issued to Garth R. Giesbrecht ("Giesbrecht"), both assigned to Univation Technologies, LLC, a wholly-owned subsidiary of The Dow Chemical Company, Midland, Michigan, USA. Wenzel and Giesbrecht describe HN5-type precatalysts and catalysts, their syntheses, and their use in gas-phase olefin polymerization reactions.

U.S. Pat. No. 6,803,339 B2 is issued to Richard A. Hall, et al. ("Hall") and is listed as being assigned to BP Corporation North America Inc. Hall notes a problem that metallocene catalysts have when fed in an olefin monomer stream into a polymerization reactor. "Metallocene catalysts are difficult to employ directly in conventional polymerization processes, and particularly in gas phase processes where the catalyst system will be dispersed in a hydrocarbon or in monomer and metered into the reactor through feed lines. Supported metallocene catalysts are optimally active when preactivated, i.e. combined with the cocatalyst component prior to being introduced into the reactor. Dispersing such catalysts in the olefin monomer stream for direct feed to the reactor system results in polymer formation and causes severe plugging of the feedlines. Moreover, polymerization proceeds before the catalyst system is dispersed fully and uniformly through the polymer bed in the reactor, resulting in highly active hot spots that promote the formation of lumps and plating out. The reactor rapidly becomes fouled, reducing catalyst yields and requiring frequent shutdowns to clean the reactor." (Column 2, lines 50 to 65; emphasis added.)

Hall elaborates on solutions that others tried before. "Temporarily reducing the activity of metallocene catalysts has been described in the art. For example, adding a dialkyborane or dialkylaluminum to the reactor during a polymerization to temporarily retard the activity of metallocene catalysts has been disclosed as a method for process control. However, catalyst activity is only partially retarded by such treatment. Catalysts directly treated with a dialkyborane or dialkylaluminum retain sufficient activity to initiate Polymerization when dispersed in the monomer feed stream. Moreover, the recovery period is very brief, too brief to allow the catalyst system to be adequately dispersed in a stirred reactor gas phase reactor bed before the catalyst recovers and polymerization proceeds." (Column 3, lines 14 to 26; emphasis added.)

Hall sought a method for temporarily and reversibly passivating metallocene catalysts whereby catalyst activity becomes reduced to a level that will allow feeding the catalyst to the reactor in contact with olefin monomer and adequately dispersing the catalyst in the reactor polymer bed prior to reactivating (column 3, lines 49 to 55). That is, Hall sought a method that would allow feeding a temporarily substantially inactivated metallocene catalyst in an olefin monomer stream into a polymerization reactor.

Hall's solution relates to a metallocene catalyst that may be temporarily and reversibly passivated by contact with an effective amount of an unsaturated hydrocarbon passivating compound (Abstract). Hall's solution also relates to a method of temporarily and reversibly passivating metallocene catalysts wherein fully active metallocene catalysts may be temporarily and reversibly passivated by contacting with an effective amount of a passivating compound (column 3, lines 58 to 62). The temporarily and reversibly passivated metallocene catalysts are further characterized as latent olefin polymerization catalysts and will have substantially reduced activity for polymerization of olefins (column 3, lines 63 to 66).

Thus, Hall sought to temporarily substantially inactivate (poison) the metallocene catalyst so that the resulting temporarily substantially inactivated metallocene catalyst could be fed in an olefin monomer stream into the reactor, and yet the temporarily substantially inactivated metallocene catalyst would not polymerize the olefin monomer in the feed stream or plug the feed line. This would give Hall time to disperse the temporarily substantially inactivated metallocene catalyst in a polymer bed in the reactor, and therein the temporarily substantially inactivated metallocene catalyst would be reversibly reactivated. Thus, Hall's metallocene catalyst is either fully active or substantially inactivated and the substantially inactivated metallocene catalyst is fed into a reactor in the presence of olefin monomer in an olefin monomer feed stream.

SUMMARY

We discovered a problem with separately feeding (i.e., away from monomer and polyolefin polymer particles) hybrid catalysts (i.e., catalysts that have only one cyclopentadienyl-containing ligand) into gas-phase olefin polymerization reactors. Olefin polymerizations are exothermic reactions that may be carried out in solution phase, slurry phase, or gas phase. The nature of a gas-phase polymerization reaction is such that it has least mass for absorbing heat of reaction exotherms. We discovered that even when an active hybrid catalyst is fed separately from olefin monomer feed(s) (and, for that matter, separately from active polyolefin polymer particles) into a gas-phase polymerization reactor containing an olefin monomer and a moving bed of polyolefin polymer, such as when the active hybrid catalyst is fed as a solution or slurry in an inert hydrocarbon solvent (e.g., alkanes or xylenes) into the reactor, once it is inside the reactor and experiencing the polymerization conditions (e.g., high temperature and pressure) the active hybrid catalyst may light-off too fast in the gas-phase polymerization reactor. That is, upon feeding (e.g., injection) of the hybrid catalyst, and before the "faster-light-off" catalyst can be fully dispersed into the moving resin bed, the catalyst starts making polymer particles in the reactor near the catalyst injection site. This locally generates heat faster than it can be absorbed, causing the polymer particles to fuse together, forming agglomerates. These agglomerates foul reactor components and/or spoil the properties of the polyolefin product.

Also, the faster-light-off hybrid catalyst, when paired with metallocene catalyst, which is slower to light-off, may create a reactivity-mismatched multimodal (e.g., bimodal or trimodal) catalyst system in the reactor. This makes polyolefin polymer particles that undesirably vary in flow index and/or density according to particle size.

These problems did not surface with metallocene catalysts, which are catalysts that contain two cyclopentadienyl groups (independently unsubstituted or substituted). Metallocene catalysts are relatively slow to light-off in the above situations.

Our technical solution to the problems arising from the "faster-light-off" hybrid catalyst employs an effective amount of a kinetics modifier compound to alter the molecular structure of the hybrid catalyst in such a way that the resulting structurally-modified hybrid catalyst has a new molecular structure and remains active, but exhibits a characteristic attenuated light-off kinetics profile ("attenuated-light-off hybrid catalyst", or more simply "attenuated hybrid catalyst") when fed separately from olefin monomer feed(s) into a gas-phase polymerization reactor. For example, the attenuated kinetics profile may comprise the length of time to peak reaction temperature ($Temp_{peak}$) for the attenuated hybrid catalyst is longer and/or the value of $Temp_{peak}$ is lower relative to that of the faster-light-off catalyst from which it was made. The length of the delay is long enough to decrease or prevent agglomerates formation, which in turn delays or prevents fouling of reactor components and/or minimizes spoiling of the properties of the polyolefin product being made thereby. Despite delaying on-set, all other things being equal, many embodiments of the attenuated hybrid catalyst exhibit a catalytic activity/polymerization productivity, expressed as number of grams dried polyolefin product made per gram of catalyst added to reactor-hour (gPE/gcat-hr), that is not significantly less than, and in some embodiments may be more than, that of the faster-light-off non-metallocene catalyst. This result is unpredictable from the art.

A method of making an attenuated-light-off hybrid catalyst ("attenuated hybrid catalyst"), the method comprising combining a faster-light-off catalyst with an effective amount of a kinetics modifier compound of formula ($A^1$), ($B^1$), or ($C^1$): $R^5$—C≡C—$R^6$ ($A^1$), $(R^5)_2C{=}C{=}C(R^6)_2$ ($B^1$), or $(R^5)(R^7)C{=}C(R^6)(R^7)$ ($C^1$) as defined herein under effective reaction conditions to give an attenuated hybrid catalyst that exhibits an attenuated light-off kinetics profile (relative to that of the faster-light-off catalyst); wherein the faster-light-off catalyst has been made by activating a hybrid precatalyst (i.e., an unactivated "coordination entity" or "ligand-metal complex") of structural formula (I): $(Cp)(L)_k(X)_x$ (I) as defined herein.

An attenuated hybrid catalyst made by the method of making.

A method of feeding a hybrid catalyst to a gas-phase polymerization reactor containing an olefin monomer and a moving bed of polyolefin polymer, the method comprising making the attenuated hybrid catalyst according to the above method, and feeding the attenuated hybrid catalyst in neat form (e.g., dry powder) or as a solution or slurry thereof in an inert hydrocarbon liquid through a feed line free of olefin monomer into the gas-phase polymerization reactor.

A multimodal (e.g., bimodal or trimodal) catalyst system comprising the attenuated hybrid catalyst and one or more a different olefin polymerization catalyst(s).

A method of feeding a multimodal (e.g., bimodal or trimodal) catalyst system to a gas-phase polymerization reactor containing an olefin monomer and a moving bed of polyolefin polymer, the method comprising making the attenuated hybrid catalyst according to the above method, contacting a solution of the attenuated hybrid catalyst and an activated metallocene catalyst in an inert hydrocarbon solvent with a support material (e.g., fumed silica) so as to make a slurry of a multimodal (e.g., bimodal or trimodal) catalyst system consisting essentially of the attenuated hybrid catalyst and the activated metallocene catalyst co-supported on the same support material and suspended in the inert hydrocarbon solvent; optionally removing the inert hydrocarbon solvent from the slurry to make the multimodal catalyst system in neat (dry powder) form; and feeding the slurry of the multimodal catalyst system or the neat form of the multimodal catalyst system through a feed line free of olefin monomer into the gas-phase polymerization reactor.

A method of making a polyolefin polymer, the method comprising contacting at least one 1-alkene monomer with the attenuated hybrid catalyst or the multimodal (e.g., bimodal or trimodal) catalyst system under gas-phase polymerization conditions in a gas-phase polymerization reactor containing a moving bed of polyolefin resin, thereby making the polyolefin polymer.

A polyolefin polymer made by the method of making same.

A manufactured article made from the polyolefin polymer.

DETAILED DESCRIPTION

The entire contents of the SUMMARY section are incorporated here by reference. Additional embodiments follow; some are numbered for easy reference.

Aspect 1. A method of making an attenuated hybrid catalyst ("attenuated-light-off hybrid catalyst"), the method comprising combining a faster-light-off catalyst with an effective amount of a kinetics modifier compound ("KMC") of formula ($A^1$), ($B^1$), or ($C^1$): $R^5$—C≡C—$R^6$ ($A^1$), $(R^5)_2C{=}C{=}C(R^6)_2$ ($B^1$), or $(R^5)(R^7)C{=}C(R^6)(R^7)$ ($C^1$) under effective reaction conditions to give an attenuated-light-off hybrid catalyst that exhibits an attenuated light-off kinetics profile (relative to that of the faster-light-off catalyst); wherein the faster-light-off catalyst has been made by activating a hybrid precatalyst of structural formula (I): $(Cp)(L)_k(X)_x$ (I); wherein in formula ($A^1$), ($B^1$), or ($C^1$) each of $R^5$ and $R^6$ independently is H or $R^7$; and each $R^7$ independently is a $(C_1$-$C_{20})$hydrocarbyl, —C(=O)—O-(unsubstituted $C_1$-$C_{20}$)hydrocarbyl), a $(C_1$-$C_{19})$heterohydrocarbyl, or a tri($(C_1$-$C_{20})$hydrocarbyl)silyl, or two $R^7$ are taken together to form a $(C_3$-$C_6)$alkylene; with the proviso that each $R^7$ lacks a carbon-carbon double bond; wherein each $(C_1$-$C_{20})$hydrocarbyl independently is unsubstituted or substituted with from 1 to 4 substituent groups $R^S$; wherein each substituent group $R^S$ is independently selected from halogen (e.g., F), unsubstituted $(C_1$-$C_5)$alkyl (e.g., $CH_3$), —C≡CH, —OH, $(C_1$-$C_5)$alkoxy, —C(=O)-(unsubstituted $(C_1$-$C_5)$alkyl), —$NH_2$, —N(H)(unsubstituted $(C_1$-$C_5)$alkyl), —N(unsubstituted $(C_1$-$C_5)$alkyl$)_2$, —COOH, —C(=O)—$NH_2$, —C(=O)—N(H)(unsubstituted $(C_1$-$C_5)$alkyl), —C(=O)—N(unsubstituted $(C_1$-$C_5)$alkyl$)_2$, —S-(unsubstituted $(C_1$-$C_5)$ alkyl), —S(=O)$_2$-(unsubstituted ($C_1$-$C_5$)alkyl), —S(=O)$_2$—$NH_2$, —S(=O)$_2$—N(H)(unsubstituted ($C_1$-$C_5$)alkyl), —S(=O)$_2$—N(unsubstituted ($C_1$-$C_5$)alkyl)$_2$, —C(=)S-(unsubstituted ($C_1$-$C_5$)alkyl) and —COO(unsubstituted ($C_1$-$C_5$)alkyl); and wherein in formula (I): metal M is Ti, Hf, or Zr; subscript k is 0 or 1; subscript x is 1, 2, or 3; the Cp group is an unsubstituted cyclopentadienyl group; a hydrocarbyl-substituted cyclopentadienyl group; or an organoheterylene-substituted cyclopentadienyl group; group L is a monodentate organoheteryl group; each X is a monodentate group independently selected from a halogen atom, (($C_1$-$C_{20}$)alkyl)$_{3-g}$-(phenyl)$_g$Si— wherein subscript g is 0, 1, 2, or 3; $CH_3$, a ($C_2$-$C_{20}$)alkyl-$CH_2$, a ($C_6$-$C_{12}$)aryl-(($C_0$-$C_{10}$)alkylene)-$CH_2$ (e.g., benzyl when ($C_6$-$C_{12}$)aryl is phenyl and ($C_0$-$C_{10}$)alkylene is ($C_0$)alkylene), a ($C_1$-$C_6$)alkyl-substituted ($C_6$-$C_{12}$)aryl, a ($C_1$-$C_6$)alkoxy-substituted ($C_6$-$C_{12}$) aryl, a ($C_1$-$C_6$)alkoxy-substituted benzyl, and a ($C_1$-$C_6$) alkyl-substituted benzyl; or one X is a 4-($C_1$-$C_{20}$)alkyl-substituted 1,3-butadiene molecule and each of the remaining X, if any, independently is the monodentate group X. Each monodentate group X may provide to M a denticity, K, of 1 and wherein at least one group X functions as a leaving group during the activating step and, optionally, at least one group X functions as a leaving group during the combining step. In some embodiments at least one X does not leave but remains coordinated to M). The X is a 4-($C_1$-$C_{20}$)alkyl-substituted 1,3-butadiene molecule may provide to M a hapticity, η, of 2 or 4 (eta$^2$ ("$\eta^2$") or eta$^4$ ("$\eta^4$")) and each of the remaining X, if any, independently is the monodentate group X. The Cp group may be the unsubstituted cyclopentadienyl group and may provide to M a hapticity, η, of 5 (eta$^5$ ("$\eta^5$")) and a denticity, κ, of 0; or the Cp may be the hydrocarbyl-substituted cyclopentadienyl group consisting of carbon and hydrogen atoms and may provide to M a hapticity, η, of 5 (eta$^5$ ("$\eta^5$")) and a denticity, κ, of 0; or the Cp group may be the organoheterylene-substituted cyclopentadienyl group and may provide to M a hapticity, η, of 5 (eta$^5$ ("$\eta^5$")) and a denticity, κ, of 1. Group L is the monodentate organoheteryl group and may provide to M a denticity, κ, of 1. In some aspects each $R^7$ independently is a ($C_1$-$C_{20}$)hydrocarbyl, which independently may be unsubstituted or substituted with from 1 to 3 substituent groups selected from halogen (e.g., F) and alkyl (e.g., $CH_3$) with the proviso that each $R^7$ lacks a carbon-carbon double bond. To remove all doubt, monodentate group X does not contain a carbon-carbon double bond or a carbon-carbon triple bond, i.e., monodentate group X is not an alkenyl or alkynyl group.

Aspect 2. The method of aspect 1 wherein the faster-light-off catalyst is of formula (II): (Cp)(L)$_k$(X)$_{x-1}$ $A^-$ (II), wherein subscripts k and x; metal M; and ligand L, and leaving group X are as defined for formula (I); and wherein the attenuated hybrid catalyst is of formula (III): (Cp)(L)$_k$(X)$_{x-2}$(R) $A^-$ (III); wherein subscripts k and x; metal M; and ligand L are as defined for formula (I); each X is the monodentate group as defined for formula (I); wherein $A^-$ is an anion (used to formally balance the positive charge of metal M); and wherein R is a ligand of formula (A), (B), or (C): —C($R^5$)=C(X)$R^6$ (A), —C($R^5$)$_2$—C(X)=C($R^6$)$_2$ (B), or —C($R^5$)($R^7$)—C(X)($R^6$)($R^7$) (C), respectively; and wherein $R^5$ to $R^7$ are as defined previously for formula ($A^1$), ($B^1$), or ($C^1$) respectively. To remove all doubt, ligand R of formula (A), (B), or (C) is obtained or derived from the kinetics modifier compound of formula ($A^1$), ($B^1$), or ($C^1$), respectively. To remove all doubt, each ligand R of formulas (A) and (B) contains a carbon-carbon double bond (i.e., an alkenyl group). To remove all doubt, the ligand R is not the same structure as that leaving group X, i.e., the definition of ligand R does not overlap the definition of leaving group X.

Aspect 3. The method of aspect 1 or 2 wherein the hybrid precatalyst is of formula (Ia): CpM(X)$_x$ (Ia), wherein metal M is Ti, Hf, or Zr; subscript x is 1, 2 or 3; Cp is the organoheterylene-substituted cyclopentadienyl group; and each X is as defined for formula (I). Without being bound by theory it is believed that the structure of the faster-light-off catalyst made from the hybrid precatalyst of formula (Ia) is of formula (IIa): CpM(X)$_{x-1}$ $A^-$ (IIa), and wherein the attenuated hybrid catalyst is of formula (IIIa): CpM(X)$_{x-2}$(R) (IIIa); wherein subscript x; metal M; and ligand Cp is as defined for formula (Ia) and X is as defined for formula (I); wherein $A^-$ is as defined for formula (II); and wherein R is as defined for formula (III).

Aspect 4. The method of aspect 3 wherein the hybrid precatalyst of formula (I) is of formula (Ia)-1

(Ia)-1

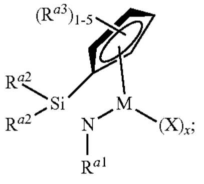

wherein each group $R^{a1}$ and $R^{a2}$ independently is a ($C_1$-$C_{20}$) alkyl (e.g., a ($C_2$-$C_5$)alkyl, e.g., 1,1-dimethylethyl); and each group $R^{a3}$ independently is H or a ($C_1$-$C_{20}$)alkyl (e.g., a ($C_1$-$C_4$)alkyl, e.g., each is 1,1-dimethylethyl); each subscript 1-5 independently is 0, 1, 2, 3, 4, or 5; and M, X, and subscript x are as defined for formula (I). Without being bound by theory it is believed that the structure of the faster-light-off catalyst made from the hybrid precatalyst of formula (Ia)-1 is of formula (IIa)-1:

$A^-$(IIa)-1

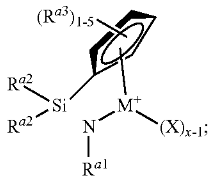

and the attenuated hybrid catalyst is of formula (IIIa)-1:

$A^-$(IIIa)-1

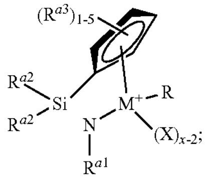

wherein metal M; and each subscript 1-5 and groups $R^{a1}$ to $R^{a3}$, and subscript x are as defined for formula (Ia)-1; X is as defined for formula (I); wherein $A^-$ is as defined for formula (II); and wherein R is as defined for formula (III). In some embodiments the hybrid precatalyst is of formula (Ia)-1a:

(Ia)-1a

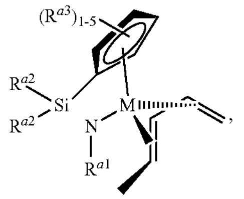

wherein each group $R^{a1}$, $R^{a2}$, and $R^{a3}$, and M, and subscript 1-5 are as defined above. In some embodiments M is Ti. The hybrid precatalyst of formula (Ia)-1 may be any one thereof described in U.S. Pat. No. 5,624,878.

Aspect 5. The method of aspect 4 wherein in the hybrid precatalyst of formula (Ia)-1 wherein group $R^{a1}$ is 1,1-dimethylethyl; and each of groups $R^{a2}$ and $R^{a3}$ is methyl M is Ti; subscript x is 1 and X is a molecule 1,3-pentadiene; and the hybrid precatalyst of formula (Ia)-1 is precatalyst (1)

(1) ("PreCat1")

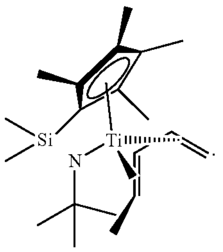

Synthesize precatalyst (1) according to the general procedure of U.S. Pat. No. 5,624,878 (e.g., Example 17). Another inventive embodiment is the precatalyst (1) per se.

Aspect 6. The method of aspect 1 or 2 wherein the hybrid precatalyst of formula (I) is of formula (Ib): $(Cp)(L)(X)_x$ (Ib); wherein M, L, X, and subscript x are as defined for formula (I); and Cp is the unsubstituted cyclopentadienyl group or hydrocarbyl-substituted cyclopentadienyl group. In some embodiments the hybrid precatalyst is of formula (Ib)-1:

(Ib)-1

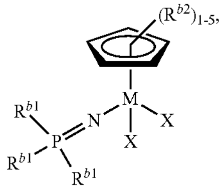

wherein each group $R^{b1}$ independently is a $(C_1\text{-}C_{20})$alkyl (e.g., a $(C_2\text{-}C_5)$alkyl, e.g., 1,1-dimethylethyl); and each group $R^{b2}$ independently is H or a $(C_1\text{-}C_{20})$alkyl (e.g., a $(C_1\text{-}C_4)$alkyl, e.g., each is 1,1-dimethylethyl); each subscript 1-5 independently is 0, 1, 2, 3, 4, or 5; and M and X are as defined for formula (I). Without being bound by theory it is believed that the structure of the faster-light-off catalyst made from the hybrid precatalyst of formula (Ib)-1 is of formula (IIb)-1:

$A^-$(IIb)-1

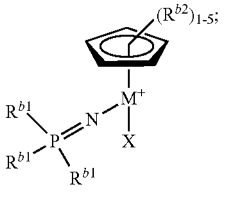

and the attenuated hybrid catalyst is of formula (IIIb)-1:

$A^-$(IIIb)-1

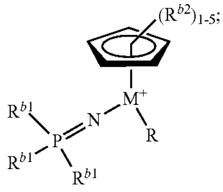

wherein each subscript 1-5 and groups $R^{b1}$ to $R^{b2}$ are as defined for formula (Ib)-1; and M and X are as defined for formula (I); wherein $A^-$ is as defined for formula (II); and wherein R is as defined for formula (III). The hybrid precatalyst of formula (Ib)-1 may be any one thereof described in U.S. Pat. No. 5,965,677.

Aspect 7. The method of aspect 6 wherein in the hybrid precatalyst of formula (Ib)-1, M is Ti, each X is methyl; and the hybrid precatalyst of formula (Ib)-1 is precatalyst (2):

(2) ("PreCat2")

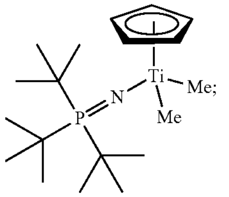

wherein Me is methyl. Synthesize precatalyst (2) according to the procedure of U.S. Pat. No. 5,965,677 (e.g., Example 8). Another inventive embodiment is the precatalyst (2) per se.

Aspect 8. The method of any one of aspects 1 to 7 wherein the kinetics modifier compound is described by any one of limitations (i) to (vi): (i) of formula ($A^1$) or ($B^1$), (ii) of formula ($A^1$) or ($C^1$), (iii) of formula ($B^1$) or ($C^1$), (iv) of formula ($A^1$), (v) of formula ($B^1$), or (vi) of formula ($C^1$). Without being bound by theory it is believed that the kinetics modifier compounds of formulas ($A^1$) and ($B^1$) yield the R ligands (A) and (B), respectively, each of which (A) and (B) have a carbon-carbon double bond as a structural feature in common therebetween. In some aspects the kinetics modifier compound consists of carbon and hydrogen atoms. In other aspects the kinetics modifier compound consists of carbon atoms, hydrogen atoms, and a least one atom selected from a halogen atom, O, N, and Si; alternatively the kinetics modifier compound consists of carbon atoms, hydrogen atoms, and a least one halogen atom; alternatively the kinetics modifier compound consists of carbon atoms, hydrogen atoms, and a least one atom selected from O, N, and Si; alternatively O and N; alternatively O and Si; alternatively N and Si; alternatively O, alternatively N; alternatively Si.

Aspect 9. The method of any one of aspects 1 to 8 wherein the kinetics modifier compound is of formula ($A^1$): $R^5$—C≡C—$R^6$ ($A^1$) that is selected from phenylacetylene; a (substituted-phenyl)acetylene; diphenylacetylene; a substituted diphenylacetylene; a cycloalkylacetylene; an acetylene of formula HC≡CSi(phenyl)$_h$(($C_1$-$C_{20}$)alkyl)$_{3-h}$, wherein subscript h is an integer from 0 to 3; and an acetylene of formula HC≡C—$(CH_2)_mCH_3$, wherein subscript m is an integer from 1 to 15, alternatively from 1 to 10, alternatively from 2 to 15. In formula (III) of aspect 2, the respective ligand R may be selected from —C(H)═C(X)-phenyl; —C(H)═C(X)-(substituted-phenyl); —$CH_2$—C(X)═C(H)-cycloalkyl; —$CH_2$—C(X)═C(H)—Si(phenyl)$_h$(($C_1$-$C_{20}$)alkyl)$_{3-h}$, wherein subscript h is as defined above; —C(H)═C(X)—$(CH_2)_mCH_3$, wherein subscript m is as defined above or —$CH_2$—C(X)═C(alkyl)$_2$. The subscript m may be an integer from 8 to 15, alternatively from 1 to 7, alternatively from 2 to 6, alternatively from 2 to 4, alternatively from 1 to 3.

Aspect 10. The method of any one of aspects 1 to 9 wherein the kinetics modifier compound is of the formula ($A^1$): $R^5$—C≡C—$R^6$ ($A^1$). The (substituted-phenyl)acetylene may be a (fluoro-substituted-phenyl)acetylene or a (methyl-substituted-phenyl)acetylene; alternatively 3,4-difluorophenylacetylene, 3,5-difluorophenylacetylene, 3-fluorophenylacetylene, 4-fluorophenylacetylene, or 2,4,5-trimethylphenylacetylene.

Aspect 11. The method of any one of aspects 1 to 10 wherein the kinetics modifier compound is of formula ($A^1$): $R^5$—C≡C—$R^6$ ($A^1$) and the kinetics modifier compound of formula ($A^1$) is selected from the group consisting of any one of KMC1 to KMC14: Kinetics Modifier Compound (1) ("KMC1"): phenylacetylene (i.e., ($C_6H_5$)C═CH); Kinetics Modifier Compound (2) ("KMC2"): 4-methylphenyl-acetylene (i.e., (4-$CH_3$—$C_6H_4$)C═CH); Kinetics Modifier Compound (3) ("KMC3"): 2,4,5-trimethylphenyl-acetylene (i.e., (2,4,5-$(CH_3)_3$—$C_6H_2$)C═CH); Kinetics Modifier Compound (4) ("KMC4"): 1,3,5-triethynylbenzene (i.e., 1,3,5-tri(HC≡C)$_3$($C_6H_3$); Kinetics Modifier Compound (5) ("KMC5"): diphenylacetylene (i.e., ($C_6H_5$)C≡C($C_6H_5$)); Kinetics Modifier Compound (6) ("KMC6"): 3-fluorophenyl-acetylene (i.e., (3-F—$C_6H_4$)C≡CH); Kinetics Modifier Compound (7) ("KMC7"): 4-fluorophenyl-acetylene (i.e., (4-F—$C_6H_4$)C≡CH); Kinetics Modifier Compound (8) ("KMC8"): 3,4-difluorophenyl-acetylene (i.e., (3,4-$F_2$—$C_6H_3$)C≡CH); Kinetics Modifier Compound (9) ("KMC9"): 3,5-difluorophenyl-acetylene (i.e., (3,5-$F_2$—$C_6H_3$)C≡CH); Kinetics Modifier Compound (10) ("KMC10"): cyclohexylacetylene (i.e., $C_6H_{11}$C≡CH); Kinetics Modifier Compound (11) ("KMC11"): phenyldimethylsilylacetylene (i.e., ($C_6H_5$)$(CH_3)_2$SiC≡CH); Kinetics Modifier Compound (12) ("KMC12"): 1-pentyne (i.e., $CH_3(CH_2)_2$C≡CH); Kinetics Modifier Compound (13) (:"KMC13"): 1-octyne (i.e., $CH_3(CH_2)_5$C≡CH); and Kinetics Modifier Compound (14) ("KMC14"): 1,7-octadiyne (i.e., HC≡C$(CH_2)_4$C≡CH).

Aspect 12. The method of any one of aspect 1 to 8 wherein the kinetics modifier compound is of formula ($B^1$): $(R^5)_2$C═C═C$(R^6)_2$ ($B^1$) and is selected from a cycloalkylallene; an alkylallene; a dialkylallene; a trialkylallene; a trialkylsilylallene; a vinylidenecycloalkane; and an alkyl ester of an allenecarboxylic acid. The cycloalkylallene may be a (($C_3$-$C_8$)cycloalkyl)allene, alternatively a cyclohexylallene. The alkylallene may be methylallene, ethylallene, propylallene, or (1,1-dimethylethyl)allene. The dialkylallene may be a 1,1-dialkylallene or a 1,3-dialkylallene; alternatively 1,1-dimethylallene. The trialkylallene may be 1,1,3-trimethylallene. The trialkylsilylallene may be trimethylsilylallene, triethylsilylallene, or dimethyl, (1,1-dimethylethyl)silylallene (i.e., tert-butyl-dimethyl-silylallene). The vinylidenecycloalkane may be vinylidinecyclohexane, of formula

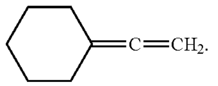

Aspect 13. The method of any one of aspects 1 to 8 and 12 wherein the kinetics modifier compound is of formula ($B^1$): $(R^5)_2$C═C═C$(R^6)_2$ ($B^1$) and the kinetics modifier compound of formula ($B^1$) is selected from the group consisting of any one of KMC15 to KMC17: Kinetics Modifier Compound (15) ("KMC15"): cyclohexylallene (i.e., ($C_6H_{11}$)C(H)═C═$CH_2$); Kinetics Modifier Compound (16) ("KMC16"): Ethyl 2,3-butadienoate (i.e., $H_2$C═C═CH—C(═O)—O—$CH_2CH_3$); and Kinetics Modifier Compound (17) ("KMC17"): 1,1-dimethylallene (i.e., $(CH_3)_2$C═C═$CH_2$).

Aspect 14. The method of any one of aspects 1 to 8 wherein the kinetics modifier compound is of formula ($C^1$): ($R^5$)($R^7$)C═C($R^6$)($R^7$) ($C^1$) and the kinetics modifier compound of formula ($C^1$) is an internal alkene. As such, the internal alkene does not have a terminal carbon-carbon double bond or a terminal carbon-carbon triple bond. The internal alkene may be selected from KMC18 to KMC20: Kinetics Modifier Compound (18) ("KMC18"): 2-butene, Kinetics Modifier Compound (19) ("KMC19"): 2-pentene, and Kinetics Modifier Compound (20) ("KMC20"): 1,2-diphenylethene. In formula (III) of aspect 2, the respective ligand R may be derived therefrom may be of formula —C(H)($CH_3$)—C(X)$CH_3$, —C(H)($CH_3$)—C(X)$CH_2CH_3$, or —C(H)(phenyl)-C(X)phenyl, respectively.

Aspect 15. The method of any one of aspects 1 to 14 further comprising, before the combining step, a step of making the faster-light-off catalyst by activating the precatalyst of formula (I) with the activator under effective activating conditions, thereby making the faster-light-off catalyst. In some embodiments the activator is an alkylaluminoxane, an organoborane compound, or an organoborate salt.

Aspect 16. The method of any one of aspects 1 to 15 wherein the method further comprises making a mixture of the attenuated hybrid catalyst, a support material, and an inert hydrocarbon solvent and removing the inert hydrocarbon solvent from the mixture so as to give the attenuated hybrid catalyst disposed on the support material. The mixture may further comprise excess activator because the activator is typically used in excess to activate the hybrid precatalyst. The removing step may be achieved via conventional evaporating of the inert hydrocarbon solvent from the mixture (i.e., conventional concentrating method), which yields an evaporated/supported, attenuated hybrid catalyst. Alternatively the removing step may be achieved by spray-drying the mixture. The spray-drying embodiment gives a spray-dried/supported, attenuated hybrid catalyst, which may have improved performance relative to the evaporated/supported, attenuated hybrid catalyst. Examples of the support material are alumina and hydrophobized fumed silica; alternatively the hydrophobized fumed silica. The hydrophobized fumed silica may be made by surface-treating an untreated, anhydrous fumed silica with an effective amount of a hydrophobing agent. The hydrophobing agent may be dimethyldichlorosilane, a polydimethylsiloxane fluid, or hexamethyldisilazane; alternatively dimethyldichlorosilane. The hydrophobized fumed silica made by surface-treating an untreated, anhydrous fumed silica with dimethyldichlorosilane may be CABOSIL TS-610.

Aspect 17. An attenuated hybrid catalyst made by the method of any one of aspects 1 to 16. The attenuated hybrid catalyst may be of or based on the formula (III) described earlier. In some embodiments the attenuated hybrid catalyst is made from the hybrid precatalyst of formula (Ia)-1, (Ia)-1a, or (Ib)-1; alternatively of formula (Ia)-1; alternatively of formula (Ia)-1a; alternatively of formula (Ib)-1.

Aspect 18. A method of feeding a hybrid catalyst to a slurry-phase or gas-phase polymerization reactor containing an olefin monomer and a moving bed of polyolefin polymer, the method comprising making the attenuated hybrid catalyst outside of the reactor and according to the method of any one of aspects 1 to 16, and feeding the attenuated hybrid catalyst in neat form (e.g., dry powder) or as a solution or slurry thereof in an inert hydrocarbon liquid through a feed line free of olefin monomer into the slurry-phase or gas-phase polymerization reactor. In embodiments the method further comprises transferring the attenuated hybrid catalyst, or a fully-active hybrid catalyst made in situ therefrom in the reactor, to a (second) gas-phase polymerization reactor, wherein it catalyzes a second olefin polymerization reaction.

Aspect 19. A multimodal (e.g., bimodal or trimodal) catalyst system comprising the attenuated hybrid catalyst of aspect 17 and at least one second catalyst selected from the group consisting of an unattenuated a hybrid catalyst described herein, a different attenuated hybrid catalyst, a post-metallocene catalyst, and a metallocene catalyst. In some embodiments the multimodal catalyst system comprises the attenuated post-metallocene catalyst of aspect 17 and only one second catalyst, alternatively only two different second catalysts. The multimodal catalyst system may further comprise a support material and the attenuated hybrid catalyst and metallocene catalyst may be disposed (e.g., spray-dried) on the support material. The attenuated hybrid catalyst and the metallocene catalyst of the multimodal catalyst system may have light-off profiles as measured by the Light-Off Vial Test Method (described later) wherein the times of their respective peak polymerization temperatures $Temp_{peak}$ are within 60 minutes, alternatively within 45 minutes, alternatively within 30 minutes of each other. When the second catalyst is the metallocene catalyst, the light-off performance of the catalysts of the multimodal catalyst system may be beneficially compatible such that a polymerization with the multimodal catalyst system making a multimodal (e.g., bimodal or trimodal) polyolefin polymer comprising a higher molecular weight (HMW) component made from the attenuated hybrid catalyst and a lower molecular weight (LMW) component does not overproduce the HMW component relative to the LMW component and thus makes less or no off-specification multimodal polyolefin polymer.

Aspect 20. A method of feeding a multimodal (e.g., bimodal or trimodal) catalyst system to a slurry-phase or gas-phase polymerization reactor containing an olefin monomer and a moving bed of polyolefin polymer, the method comprising making the attenuated hybrid catalyst outside of the reactor and according to the method of any one of aspects 1 to 16, contacting a solution of the attenuated hybrid catalyst and an activated metallocene catalyst in an inert hydrocarbon solvent with a support material (e.g., fumed silica) outside of the reactor and so as to make a slurry of a multimodal (e.g., bimodal or trimodal) catalyst system consisting essentially of the attenuated hybrid catalyst and the activated metallocene catalyst co-supported on the same support material and suspended in the inert hydrocarbon solvent; optionally removing the inert hydrocarbon solvent from the slurry to make the multimodal catalyst system in neat (dry powder) form; and feeding the slurry of the multimodal catalyst system or the neat form of the multimodal catalyst system through a feed line free of olefin monomer into the slurry-phase or gas-phase polymerization reactor.

Aspect 21. A method of making a polyolefin polymer, the method comprising contacting at least one 1-alkene monomer with the attenuated hybrid catalyst made by the method of any one of aspects 1 to 16, or the multimodal catalyst system of aspect 19, under slurry-phase or gas-phase polymerization conditions in a slurry-phase or gas-phase polymerization reactor, respectively, containing a moving bed of polyolefin resin, thereby making the polyolefin polymer. The method may comprise before the contacting step a step comprising feeding the attenuated hybrid catalyst made by the method of any one of aspects 1 to 16, or feeding the multimodal catalyst system of aspect 18, into the slurry-phase or gas-phase polymerization reactor containing the moving bed of polyolefin resin and at least one 1-alkene monomer under slurry-phase or gas-phase polymerization conditions, respectively, so as to allow attenuated light-off of the attenuated hybrid catalyst and subsequent polymerization of the at least one 1-alkene monomer, thereby making the polyolefin polymer. The moving bed may be a stirred bed or a fluidized bed. The at least one 1-alkene monomer may be ethylene or a combination of ethylene and a comonomer selected from propylene, 1-butene, 1-hexene, and 1-octene. In embodiments the reactor is a first gas-phase polymerization reactor and is under first gas-phase polymerization conditions. Alternatively, the reactor may be a slurry-phase polymerization reactor and the polymerization conditions may be slurry-phase polymerization conditions. In some such embodiments, the method may further comprise transferring active polymer granules, made in the first gas-phase polymerization reactor under the first gas-phase polymerization conditions or made in the slurry-phase polymerization reactor under slurry-phase polymerization conditions and in either case containing (in the granules) active hybrid catalyst, into a (second) gas-phase polymerization reactor under (second) gas-phase polymerization conditions, which are different than the first gas-phase polymerization conditions used in the first gas-phase polymerization reactor or the slurry-phase polymerization conditions used in the slurry-phase polymerization reactor, as the case may be, thereby making a multimodal (e.g., bimodal or trimodal) polyolefin polymer (i.e., a polyolefin polymer having a multimodal (e.g., bimodal or trimodal) molecular weight distribution $M_w/M_n$) in the (second) gas-phase polymerization reactor.

Aspect 22. A polyolefin polymer made by the method of making of aspect 21. The polyolefin polymer, as obtained in virgin form from the slurry-phase or gas-phase polymerization reactor, may be in the form of granules having a lower amount of aggregates (fused granules) than a comparative polyolefin polymer obtained in virgin form from a slurry-phase or gas-phase polymerization reactor, respectively, run under identical polymerization conditions except wherein the attenuated hybrid catalyst is replaced with the faster-light-off catalyst.

Aspect 23. A manufactured article (e.g., a blown or cast film) made from the polyolefin polymer of aspect 22. The manufactured article may have a lower gel count than a comparative manufactured article made from the comparative polyolefin polymer.

Aspect 24. An inventive embodiment of any one of aspects 1 to 23 wherein the attenuated hybrid catalyst is free of a support material. For example, free of a fumed silica or an alumina.

Aspect 25. A hybrid precatalyst selected from the group consisting of the aforementioned hybrid precatalysts of formula (I) to (2).

Aspect 26. A hybrid catalyst made by contacting the hybrid precatalyst of aspect 25 with an activator.

In some embodiments metal M is Zr or Hf; alternatively M is Zr or Ti; alternatively M is Ti or Hf; alternatively M is Zr; alternatively M is Hf; alternatively M is Ti.

Unsubstituted cyclopentadienyl group. A carbanion of formula $[C_5H_5]^-$.

Hydrocarbyl-substituted cyclopentadienyl group. A carbanion formally derived by replacing one or more hydrogen atoms of an unsubstituted cyclopentadienyl group with one or more hydrocarbyl groups and/or replacing two hydrogen atoms on adjacent ring carbon atoms with one or two hydrocarbylene groups. Examples of such hydrocarbyl groups are $(C_1-C_{10})$alkyl, e.g., methyl, ethyl, 1-methylethyl, propyl, and butyl. Examples of such hydrocarbylene groups are —C(H)═C(H)—C(H)═C(H)— (e.g., as in an indenyl group or, when two such groups are used, in a fluorenyl group); —$C(CH_3)$═C(H)—C(H)═C(H)—; —C(H)═C($CH_3$)—C(H)═C(H)—; —C(H)═C(H)—C($CH_3$)═C(H)—; —C(H)═C(H)—C(H)═C($CH_3$)—; and —C(H)═C($CH_3$)—C(H)═C($CH_3$)— (e.g., as in a 1,5-dimethylindenyl group (wherein one methyl is on the 5-membered ring and one methyl is on the 6-membered ring) and 4,6-dimethylindenyl group (wherein both methyl groups are on the 6-membered ring)).

Organoheterylene-substituted cyclopentadienyl group. A cyclopentadienyl group that is substituted by an organoheterylene group, which is defined later and is a divalent heteroatom-containing organo group, which has a radical on a carbon atom and a radical on a heteroatom (e.g., N). E.g., the organoheterylene group of formula —($R^{a1}$)N($R^{a2}$)$_2$Si— (as used in formula (Ia)-1), such as a tertiary-$(C_4-C_8)$alkylamino-dimethylsilyl group.

The method of making the attenuated hybrid catalyst. The method comprises combining the faster-light-off catalyst with the effective amount of the kinetics modifier compound of formula ($A^1$), ($B^1$), or ($C^1$) under the effective reaction conditions so as to make the attenuated hybrid catalyst. The faster light-off catalyst may be of formula (II) and the attenuated hybrid catalyst may be of formula (III). The combining step may be performed in the absence of the precatalyst of formula (I). The combining step may be performed in the presence of unreacted activator if the activator is used in excess in an activating step. The faster-light-off catalyst contains the leaving group X bonded to metal atom M. In the combining step, the kinetics modifier compound reacts with the faster-light-off catalyst in such a way so as to displace the leaving group X from the faster-light-off catalyst and replace it with the ligand R derived from the kinetics modifier compound. The ligand is bonded to the metal atom M in the resulting attenuated hybrid catalyst. In some aspects the attenuated hybrid catalyst is of formula (III) and the faster-light-off catalyst is of formula (II) and the precatalyst is of formula (I), all wherein M is Ti and each X is methyl or one X is 1,3-pentadiene.

Embodiments of the method of making may comprise any one of synthetic schemes 1 to 11.

Synthesis Scheme 1: Step (a) hybrid precatalyst+excess activator→intermediate mixture of activated hybrid catalyst+leftover activator. Step (b) intermediate mixture+effective amount of kinetics modifier compound→attenuated hybrid catalyst.

Synthesis Scheme 2: Step (a) hybrid precatalyst+effective amount of kinetics modifier compound→intermediate hybrid precatalyst (unreacted mixture or reaction product of hybrid precatalyst+kinetics modifier compound). Step (b) intermediate hybrid precatalyst+activator (e.g., an alkylaluminoxane such as methylaluminoxane ("MAO"))→attenuated hybrid catalyst.

Synthesis Scheme 3: Step (a) hybrid precatalyst+activator (e.g., an alkylaluminoxane such as methylaluminoxane ("MAO"))→activated hybrid catalyst (faster-light-off catalyst). Step (b) activated hybrid catalyst+effective amount of kinetics modifier compound→attenuated hybrid catalyst.

Synthesis Scheme 4: Step (a) activator (e.g., an alkylaluminoxane such as methylaluminoxane ("MAO"))+effective amount of kinetics modifier compound+intermediate solution. Step (b) Intermediate solution+hybrid precatalyst→attenuated light-off hybrid catalyst.

Synthesis Scheme 5: Step (a) activator→hybrid precatalyst←effective amount of kinetics modifier compound (simultaneous but separate additions of activator and kinetics modifier to hybrid precatalyst)→attenuated hybrid catalyst. Step (b): none.

Synthesis Scheme 6: Step (a) hybrid precatalyst+support material→supported hybrid precatalyst. (b) supported hybrid precatalyst+an amount of activator→intermediate mixture of activated hybrid catalyst+leftover activator disposed on (or in equilibrium with) the support material. Step (c) intermediate mixture+effective amount of kinetics modifier compound→attenuated hybrid catalyst disposed on (or in equilibrium with) support material. In some aspects step (a) further includes an inert hydrocarbon solvent and deposition on the support material is performed by evaporating the solvent, alternatively by spray-drying. The amount of activator may be a stoichiometric amount relative to the metal M of the hybrid catalyst (e.g., a molar ratio of 1.0 to 1.0); alternatively a less than stoichiometric amount relative thereto (e.g., a molar ratio of from 0.1 to 0.94); alternatively an excess amount (e.g., a molar ratio from 1.1 to 10,000) relative thereto.

Synthesis Scheme 7: Step (a) hybrid precatalyst+effective amount of kinetics modifier compound+support material→intermediate mixture of hybrid precatalyst and kinetics modifier compound disposed on (or in equilibrium with) support material. Step (b) intermediate mixture+activator (e.g., an alkylaluminoxane such as methylaluminoxane ("MAO"))→attenuated hybrid catalyst disposed on (or in equilibrium with) support material. In some aspects step (a) further includes an inert hydrocarbon solvent and deposition on the support material is performed by evaporating the solvent, alternatively by spray-drying.

Synthesis Scheme 8: Step (a) hybrid precatalyst+support material+activator (e.g., an alkylaluminoxane such as methylaluminoxane ("MAO"))→activated hybrid catalyst (faster-light-off catalyst) disposed on (or in equilibrium with) support material. Step (b) supported activated hybrid catalyst+effective amount of kinetics modifier compound→attenuated hybrid catalyst disposed on (or in equilibrium with) support material. In some aspects step (a) further includes an inert hydrocarbon solvent and deposition on the support material is performed by evaporating the solvent, alternatively by spray-drying.

Synthesis Scheme 9: Step (a) activator (e.g., an alkylaluminoxane such as methylaluminoxane ("MAO"))+effective amount of kinetics modifier compound→intermediate solution. Step (b) Intermediate solution+hybrid precatalyst+support material→attenuated light-off hybrid catalyst disposed on (or in equilibrium with) support material. In some aspects step (b) further includes an inert hydrocarbon solvent and deposition on the support material is performed by evaporating the solvent, alternatively by spray-drying.

Synthesis Scheme 10: Step (a) activator→hybrid precatalyst+support material←effective amount of kinetics modifier compound (simultaneous but separate additions of activator and kinetics modifier compound to mixture of hybrid precatalyst+support material)→attenuated hybrid catalyst disposed on (or in equilibrium with) support material. Step (b): none. In some aspects step (a) further includes an inert hydrocarbon solvent and deposition on the support material is performed by evaporating the solvent, alternatively by spray-drying.

Scheme 11: Step (a): activator (e.g., an alkylaluminoxane such as methylaluminoxane ("MAO"))+support material (e.g., hydrophobic fumed silica)+inert hydrocarbon solvent→slurry of supported activator disposed on (or in equilibrium with) support material. Step (b): spray-dry slurry of step (a)→spray-dried supported activator disposed on support material in form of a dry powder (e.g., spray-dried MAO on hydrophobic fumed silica as dry powder ("SDMAO" or "sdMAO"). Step (c): mix hybrid precatalyst+spray-dried supported activator of step (b)+inert hydrocarbon solvent+suspension of supported faster-light-off hybrid catalyst disposed on (or in equilibrium with) the support material. Step (d): mix suspension from step (c) with effective amount of a kinetics modifier compound→suspension of a supported attenuated hybrid catalyst disposed on (or in equilibrium with) the support material in inert hydrocarbon solvent. Optional step (e): remove inert hydrocarbon solvent from the suspension of supported attenuated hybrid catalyst→supported attenuated hybrid catalyst disposed on support material in the form of a dry powder. Step (e) may be performed by conventional evaporating of the inert hydrocarbon solvent from the suspension from step (d) or by spray-drying the suspension from step (d).

The multimodal catalyst system may be made fed into the gas-phase polymerization reactor. If desired an additional quantity of the attenuated post-metallocene catalyst or an additional quantity of the second catalyst (e.g., a metallocene catalyst) may be separately fed into the reactor as a solution thereof in an inert hydrocarbon solvent, wherein it contacts the multimodal catalyst system. Such a separate catalyst solution is sometimes called a trim catalyst. Alternatively, the multimodal catalyst system may be contacted with a feed of the trim catalyst in a feed line heading into the reactor. In other embodiments the multimodal catalyst system may be made in situ in a gas-phase polymerization reactor by adding the attenuated post-metallocene catalyst and at least one second catalyst separately into the reactor, wherein they contact each other, thereby making the multimodal catalyst system in situ in the reactor.

The method of any one of the above aspects may further comprise a step of transferring polymer granules, made in the gas-phase or slurry-phase polymerization reactor and containing in the granules fully-active hybrid catalyst, into a (second) gas-phase polymerization reactor.

Kinetics-modifier compound ("KMC"). The kinetics modifier compound of formula ($A^1$) is $R^5—C≡C—R^6$ ($A^1$). The kinetics modifier compound of formula ($B^1$) is $(R^5)_2C{=}C{=}C(R^6)_2$ ($B^1$). The kinetics modifier compound of formula ($C^1$) is $(R^5)(R^7)C{=}C(R^6)(R^7)$ ($C^1$). The kinetics-modifier compound of formula ($A^1$), ($B^1$), or ($C^1$) beneficially does not function as a poison to the hybrid catalyst or may at most function mildly as such. The compound of formula ($A^1$) is an alkyne, that of formula ($B^1$) is an allene, and that of formula ($C^1$) is an internal alkene. The kinetics modifier compound is free of a vinyl functional group (i.e., lacks a group of formula $—C(H){=}CH_2$).

In some embodiments the kinetics modifier compound is as defined in any one of the above-described numbered aspects.

In some embodiments of the kinetics modifier compound of formula ($A^1$), ($B^1$), or ($C^1$), the ($C_1$-$C_{20}$)hydrocarbyl is ($C_2$-$C_6$)alkyl, ($C_3$-$C_8$)cycloalkyl, or phenyl. In some embodiments the —C(=O)—O-(unsubstituted $C_1$-$C_{20}$)hydrocarbyl) is —C(=O)—O-(unsubstituted $C_1$-$C_5$)alkyl), alternatively —C(=O)—O-ethyl.

In some embodiments at least one X is (($C_1$-$C_{20}$) alkyl)$_{3-g}$-(phenyl)$_g$Si— wherein subscript g is 0, 1, 2, or 3; alternatively wherein subscript g is 0 or 1; alternatively 0; alternatively 1. In some aspects at least one X is a ($C_6$-$C_{12}$) aryl-(($C_0$-$C_{10}$)alkylene)-$CH_2$ (e.g., benzyl). In some aspects each X is independently a ($C_6$-$C_{12}$)aryl-(($C_0$-$C_{10}$)alkylene)-$CH_2$, alternatively one X is a ($C_6$-$C_{12}$)aryl-(($C_0$-$C_{10}$)alkylene)-$CH_2$ (e.g., benzyl) and the other X is F, Cl, or methyl; alternatively each X is benzyl. In some aspects each X is benzyl, alternatively one X is a benzyl and the other X is F, Cl, or methyl. In some aspects at least one X, alternatively each X is a ($C_1$-$C_6$)alkoxy-substituted ($C_6$-$C_{12}$)aryl or a ($C_1$-$C_6$)alkoxy-substituted benzyl. Without being bound by theory it is believed that the structure of the attenuated hybrid catalyst is similar to the structure of the faster-light-off catalyst except wherein one of the leaving groups X of the faster-light-off catalyst has been replaced by a attenuated-leaving group R in the attenuated hybrid catalyst wherein R is defined later and is derived from the kinetics modifier compound. Attenuated-leaving group R of the attenuated hybrid catalyst is structurally different than, and slower to leave than, the leaving group X of the faster-light-off catalyst.

Ligand R derived from the kinetics modifier compound. The ligand in the attenuated hybrid catalyst that is derived from the kinetics modifier compound may be the group R ("ligand R"). Without being bound by theory, the ligand R is believed to be primarily responsible for the improved kinetics profile of the attenuated hybrid catalyst (e.g., of formula (III)) relative to that of the faster-light-off catalyst (e.g., of formula (II)) from which it was made. The ligand R may be of formula (A), (B), or (C): $—C(R^5){=}C(X)R^6$ (A), $—C(R^5)_2—C(X){=}C(R^6)_2$ (B), or $—C(R^5)(R^7)—C(X)(R^6)(R^7)$ (C); wherein each of X and $R^5$ to $R^7$ is as described earlier. In some embodiments R is the ligand of formula (A) or (B), alternatively R is the ligand of formula (A) or (C), alternatively R is the ligand of formula (B) or (C), alternatively R is the ligand of formula (A), alternatively R is the ligand of formula (B), alternatively R is the ligand of formula (C). The ligands of formulas (A) and (B) both contain a carbon-carbon double bond, which is believed to be extremely slow to polymerize under the gas-phase polymerization conditions.

Not wishing to be bound by theory, reaction of an alkene monomer (e.g., ethylene, propylene, 1-butene, 1-hexene, 1-octene, etc.) with the attenuated-light off catalyst is believed to be by insertion of the alkene monomer into the bond between the M metal center and the attenuated-leaving group R. This insertion may be much slower than the corresponding insertion reaction of an alkene monomer into the bond between the M metal center and the leaving group X of the faster-light-off catalyst. The inventive slower reaction may delay the onset of polymerization. After the first one (or few) alkene monomer insertion reactions, the attenuated-leaving group R is no longer bonded to the metal center, so that all subsequent insertions occur at a similar rate to that of the faster light-off catalyst. Because only the first one (or few) of the thousands or millions of insertion reactions that a catalyst performs are slowed, the overall catalyst productivity may not be significantly reduced. In fact, the attenuated-light off catalyst may have increased productivity because its exotherm is decreased relative to the exotherm of the faster-light-off catalyst. This is because an exothermic reaction that increases the temperature experienced by a catalyst may lead to faster deactivation of the catalyst, which deactivation can decrease productivity for some catalysts, such as some hybrid catalysts.

In the ligand R of formula (A), (B), or (C), each of $R^5$ and $R^6$ independently is H or $R^7$, and wherein each $R^7$ independently is a $(C_1-C_{20})$hydrocarbyl or a $(C_1-C_{17})$heterohydrocarbyl with the proviso that each $R^7$ lacks a carbon-carbon double bond. The $(C_1-C_{20})$hydrocarbyl may be unsubstituted and consist of carbon atoms and hydrogen atoms or the $(C_1-C_{20})$hydrocarbyl may be substituted and consist of carbon, hydrogen, and one or more halogen atoms. Each halogen atom is independently selected from F, Cl, Br, and I; alternatively from F, Cl, and Br; alternatively from F and Cl; alternatively from F; alternatively from Cl. The unsubstituted $(C_1-C_{20})$hydrocarbyl may be an unsubstituted $(C_1-C_{20})$alkyl, an unsubstituted $(C_3-C_{20})$cycloalkyl, an unsubstituted $(C_6-C_{12})$aryl, an unsubstituted $((C_1-C_4)alkyl)_{1-3}$-phenyl, or an unsubstituted $(C_6-C_{12})$aryl-$(C_1-C_6)$alkyl. The substituted $(C_1-C_{20})$hydrocarbyl may be a monofluoro or difluoro derivative of the aforementioned unsubstituted $(C_1-C_{20})$hydrocarbyl, such as 2-(3,4-difluorophenyl)-ethen-1-yl (of formula (A)).

Each $(C_1-C_{19})$heterohydrocarbyl, of embodiments of $R^5$ to $R^7$ containing same, may be unsubstituted and consist of carbon atoms, hydrogen atoms, and at least one heteroatom selected from N and O or the $(C_1-C_{17})$heterohydrocarbyl may be substituted and consist of carbon atoms, hydrogen atoms, at least one heteroatom selected from N and O, and one or more halogen atoms. The unsubstituted $(C_1-C_{17})$ heterohydrocarbyl may be $(C_1-C_{19})$heteroalkyl, $(C_3-C_{19})$ heterocycloalkyl, $(C_6-C_{12})$heteroaryl, $((C_1-C_4)alkoxy)_{1-3}$-phenyl, or $(C_6-C_{12})$heteroaryl-$(C_1-C_6)$alkyl. The substituted $(C_1-C_{17})$heterohydrocarbyl may be a monofluoro or difluoro derivative of the aforementioned unsubstituted $(C_1-C_{17})$ heterohydrocarbyl, such as 2-(3,4-dimethoxyphenyl)-ethen-1-yl (of formula (A)).

The structure of ligand R is different than that of ligand X and, for that matter, that of anion $A^-$.

The attenuated hybrid catalyst. The attenuated hybrid catalyst (e.g., of formula (III)) is made from the faster-light-off catalyst (e.g., of formula (II)) according to the method. The attenuated hybrid catalyst is a hybrid catalyst that contains bonded to its metal atom M (e.g., Ti, Zr, or Hf) a ligand (e.g., R) derived from the kinetics modifier compound. The attenuated hybrid catalyst is a new hybrid catalyst. In some embodiments the attenuated hybrid catalyst is the attenuated hybrid catalyst of formula (III).

It is believed that all other things being equal the attenuated hybrid catalyst (e.g., of formula (III)) may work without significantly decreasing the overall catalytic activity relative to that of the faster-light-off catalyst (e.g., of formula (II)) from which it was made. That is, despite delaying on-set, the catalyst's activity/polymerization productivity, expressed as number of grams dried polyolefin product made per gram of catalyst added to reactor-hour (gPE/gcat-hr), may not be significantly less than, and in some embodiments may be more than, that of the faster-light-off hybrid catalyst. For example, the attenuated hybrid catalyst may have greater than 200%, alternatively from 70.0% to 180%, alternatively from 70.0% to 150.0%, alternatively from 70.0% to 120%, alternatively from 80.0% to 120%, alternatively from 90.0% to 120%, alternatively from 100.0% to 120%, alternatively from 110% to 120%, alternatively from 70.0% to 110%, alternatively from 80.0% to 110%, alternatively from 90.0% to 110%, alternatively from 100.0% to 110%, alternatively from 70.0% to ≤100%, alternatively from 80.0% to ≤100%, alternatively from 90.0% to ≤100%, of the productivity of the faster light-off catalyst from which it is made.

It is believed that the attenuated hybrid catalyst of formula (III) may inhibit catalyst light-off and beneficially improve gas-phase reactor operability by decreasing rate of fouling and increasing time between reactor shutdowns relative to the faster-light-off catalyst (e.g., of formula (II)) from which it was made.

It is believed that attenuated hybrid catalyst (e.g., of formula (III)) may present an improved polymerization kinetics profile than that of the faster-light-off catalyst of formula (II) from which it was made. This improved polymerization kinetics profile would beneficially increase compatibility of the attenuated hybrid catalyst (e.g., of formula (III)) with slower-light-off olefin polymerization catalysts, such as some metallocene catalysts, and improve performance of the resulting light-off-compatible multimodal (e.g., bimodal or trimodal) catalyst system, relative to that of the faster-light-off catalyst (e.g., of formula (II)) from which it was made.

Additionally, it is believed that the attenuated hybrid catalyst (e.g., of formula (III)) may be stored and transported at ambient temperature, instead of at cold storage and cold transportation desired for the faster-light-off catalyst (e.g., of formula (II)) from which it was made, until the former can be used in a chemical process. It is believed that the attenuated hybrid catalyst (e.g., of formula (III)) may achieve any one or a combination of any two or more such benefits.

In some embodiments the attenuated hybrid catalyst (e.g., of formula (III)), and the method of polymerizing an olefin monomer, are free of excess amount of kinetics-modifier compound of formula ($A^1$), ($B^1$), or ($C^1$). In other embodiments the attenuated post-metallocene catalyst and method have an excess amount of the kinetics modifier compound. Such embodiments of the attenuated hybrid catalyst (e.g., of formula (III)) may be made by combining the faster-light-off catalyst (e.g., of formula (II)) with a molar ratio of moles of the kinetics modifier compound to moles of metal M of formula (II) of from greater than 0 to 1.0, alternatively from 1.1 to 50, alternatively from 0.5 to 40, alternatively from 0.5 to 30, alternatively from 0.5 to 20, alternatively from 0.5 to 10, alternatively from 0.5 to 2, alternatively from 0.8 to 1.2, alternatively from 0.9 to 1.1 (e.g., 1.0). In such embodiments the kinetics-modifier compound of formula ($A^1$), ($B^1$), or ($C^1$) is used at a stoichiometric amount (molar ratio 1.0) or less than a stoichiometric amount (molar ratio from >0 to 0.99). When the kinetics-modifier compound is used at a less than stoichiometric amount, the resulting attenuated hybrid catalyst (e.g., of formula (III)) has partially attenuated light-off activity relative to that of the faster-light-off catalyst (e.g., of formula (II)) from which it was made. The partially attenuated light-off activity may be helpful when the faster-light-off catalyst (e.g., of formula (III)) is only mildly overactive. Generally, the higher the molar ratio of moles of the kinetics modifier compound to moles of metal M (e.g., of formula (II)), the greater the attenuation of the overactivity of the faster-light-off catalyst (e.g., of formula (II)).

In some embodiments the attenuated hybrid catalyst (e.g., of formula (III)), and the method of polymerizing an olefin monomer, contain an excess amount of kinetics-modifier compound (KMC) of formula ($A^1$), ($B^1$), or ($C^1$). Such embodiments of the attenuated hybrid catalyst (e.g., of formula (III)) may be made by combining the faster-light-off catalyst (e.g., of formula (II)) with a molar ratio of moles of the kinetics modifier compound to moles of metal M of formula (II) of greater than 1.0, e.g., KMC/M molar ratio from 1.1 to 50, alternatively from 1.1 to 40, alternatively from 1.1 to 30, alternatively from 1.1 to 20, alternatively from 1.1 to 10; alternatively from 2 to 20; alternatively greater than 20. Remarkably in some embodiments, even when the kinetics-modifier compound is used in an excess amount within the foregoing ranges (KMC/M molar ratio up to about 50), the catalytic activity of the attenuated hybrid catalyst (e.g., of formula (III)) and/or productivity of the gas-phase polymerization reaction using same may not be significantly decreased, and may be increased, relative to those of faster-light-off catalyst (e.g., of formula (II)) from which it was made. In other embodiments when the kinetics-modifier compound is used in an excess amount, the catalytic activity of the attenuated hybrid catalyst (e.g., of formula (III)) and/or productivity of the gas-phase polymerization reaction using same may be significantly decreased relative to those of faster-light-off catalyst (e.g., of formula (II)) from which it was made. Although the reason for the decrease is not understood, it might be possible that excess kinetics-modifier compound may compete with alkene monomer for displacing the attenuated-leaving group R of formula (III) in equilibrium fashion. Using an excess amount of the kinetics-modifier compound may be helpful when the exact molar amount of metal M of the faster-light-off catalyst (e.g., of formula (II)) is not precisely known or may vary from lot to lot thereof.

Attenuated-light-off kinetics profile. The attenuated hybrid catalyst (e.g., of formula (III)) exhibits an attenuated light-off kinetics profile. For example, the attenuated kinetics profile may comprise the length of time to peak reaction temperature $Temp_{peak}$ for the attenuated hybrid catalyst is longer and/or the value of $T_{max}$ is lower relative to that of the faster-light-off catalyst from which it was made. A longer time of at least 0.65 minute from an injection of catalyst (Time zero ($Time_0$)) into a reactor containing olefin monomer but no catalyst to time at which peak polymerization reaction temperature is reached ($Temp_{peak}$). The greater the value of $Temp_{peak}$, the greater the delay in catalyst light-off.

For comparing light-off times of different catalysts, use the same olefin monomer (e.g., 1-octene) and the same reactor. For rapid catalyst screening, use a 40-mL glass vial as the reactor and the Light-Off Vial Test Method described later as the test method.

Effective amount of the kinetics modifier compound (KMC). A quantity of kinetics modifier compound (KMC) sufficient to attenuate light-off of catalyst. The effective amount of KMC may be expressed in absolute terms compared to the amount of (pre)catalyst metal M or in relative terms compared to the attenuated light-off performance or as a combination thereof.

In absolute terms in some embodiments the effective amount of the kinetics modifier compound may be expressed as a molar ratio of moles of kinetics modifier compound to moles of metal M ("$KMC_{mol}/M_{mol}$"), wherein M is the M of the hybrid precatalyst of structural formula (I), e.g., M is a Group 4 metal. In some embodiments the effective amount of the KMC is expressed as a $KMC_{mol}/M_{mol}$ of ≥0.50/1.0, alternatively ≥0.9/1.0; alternatively ≥1.0/1.0; alternatively ≥1.5/1.0; alternatively ≥1.9/1.0; alternatively ≥3/1.0; alternatively ≥5/1.0; alternatively ≥6/1.0; alternatively ≥9/1.0; alternatively ≥10.0/1.0, alternatively ≥10.0/1.0, alternatively ≥20.0/1.0, alternatively ≥30.0/1.0, alternatively ≥40.0/1.0, alternatively ≥50.0/1.0. Said another way, the immediately foregoing embodiments may be described by expressing the effective amount of the KMC as an inverse molar ratio of moles of metal M to moles of kinetics modifier compound ("$M_{mol}/KMC_{mol}$") as follows: ≤1.0/0.5; alternatively ≤1.0/0.9; alternatively ≤1.0/1.0; alternatively ≤1.0/1.5; alternatively ≤1.0/1.9; alternatively ≤1.0/3.0; alternatively ≤1.0/5.0; alternatively ≤1.0/6.0; alternatively ≤1.0/9.0; alternatively ≤1.0/10.0, alternatively ≤1.0/20.0, alternatively ≤1.0/30.0, alternatively ≤1.0/40.0, alternatively ≤1.0/50.0, respectively. Generally it is believed that $KMC_{mol}/M_{mol}$ higher than about 50/1.0 may undesirably prevent light-off or functioning of a post-metallocene catalyst containing same. For practical reasons, however (e.g., cost of KMC and/or post-polymerization processing operations/costs (e.g., stripping of excess KMC from a polyolefin resin)), in some embodiments the $KMC_{mol}/M_{mol}$ is limited to at most 40/1; alternatively at most 30/1; alternatively at most 20/1; alternatively at most 10.0; alternatively at most 6.0; alternatively at most 5.0.

In relative terms of attenuated light-off performance, the effective amount of the kinetics modifier compound (KMC) may be expressed by a result measured by the Light-off Vial Test Method described later. For example, as separately measured by the Light-off Vial Test Method described later, with the attenuated hybrid catalyst and the faster-light-off hybrid catalyst from which it was made with the kinetics modifier compound; the effective amount of the kinetics modifier compound (KMC) may have any one of features (i) to (xii) is observed after catalyst injection: (i) a time delay in start of exotherm, i.e., reaction temperature rise (i.e., a greater length of time in minute(s) from addition time zero ($Time_0$) to start of temperature exotherm time ($Time_{exo}$)); (ii) a slower maximum rate of increase in degrees Celsius per minute (° C./min.) in reaction temperature (e.g., a lower maximum slope in a plot of reaction temperature on y-axis versus time post injection of catalyst on the x-axis); (iii) a lower peak reaction temperature reached ($Temp_{peak}$) in ° C.; (iv) a longer time of at least 0.65 minute from addition time at $Time_0$ to Time Peak Temperature ($Time_{peak}T$); (v) both (i) and (ii) but not (iii) or (iv); (vi) both (i) and (iii) but not (ii) or (iv); (vii) both (ii) and (iii) but not (i) or (iv); (viii) both (i) and (iv) but not (ii) and (iii); (ix) both (ii) and (iv) but not (i) or (iii); (x) both (iii) and (iv) but not (i) or (ii); (xi) any three of (i) to (iv); and (xii) each of (i) to (iv). In some embodiments the attenuated-light-off and the effective amount of the KMC is characterized by at least feature (iv), alternatively by feature (iv) only. In some embodiments the longer time of feature (iv) is a time of at least 0.65 minute (39 seconds or longer) from addition time at $Time_0$ to Time Peak Temperature ($Time_{peak}T$) of at least 0.65 minute; alternatively at least 1.0 minute; alternatively at least 1.5 minutes; alternatively from 1.5 minute to 55 minutes; alternatively from 1.6 to 100 minutes; alternatively from 1.6 to 55 minutes; alternatively from 1.6 to 10.0 minutes; alternatively from 10.1 to 20.0 minutes; alternatively from 20.1 to 30.0 minutes; alternatively from 30.1 to 40.0 minutes; alternatively from 40.1 to 50.0 minutes; alternatively from 50.1 to 55 minutes alternatively from 2.0 to 29 minutes; alternatively from 30.1 to 50.4 minutes; all measured according to the Light-off Vial Test Method described later. In some embodiments the attenuated-light-off and the effective amount of the KMC is characterized by feature (viii). In some embodiments the attenuated-light-off is characterized by feature (ix). In some embodiments the attenuated-light-off and the effective amount of the KMC is characterized by feature (x). In some embodiments the attenuated-light-off is characterized by feature (xi).

The delay in time for reaching $Temp_{max}$ by the attenuated hybrid catalyst relative to the time for reaching $Temp_{max}$ by the faster-light-off catalyst may be from 0.70 minute to 500 minutes (e.g., an example is 293 minutes), alternatively from 0.70 minute to 120 minutes, alternatively from 1.0 to 120 minutes, alternatively from 5 to 90 minutes, alternatively from 10 to 70 minutes.

In some embodiments the kinetics profile of the attenuated hybrid catalyst may be characterized as a decrease in peak temperature ($Temp_{peak}$) (° C.) relative to the $Temp_{max}$ of the faster-light-off catalyst from which it was made when run under the same polymerization conditions according to the Light-Off Batch Reactor Test Method described later. In the Light-Off Batch Reactor Test Method the $Temp_{max}$ of the attenuated hybrid catalyst may be from 1° to 16° C., alternatively from 2° to 15° C., alternatively 3° to 14° C. lower than the $T_{max}$ of the faster-light-off catalyst from which it was made. In some embodiments the faster-light-off hybrid catalyst is that made from any one of the hybrid precatalysts (1) to (2) described earlier.

In some embodiments the kinetics profile of the attenuated hybrid catalyst may be characterized as an absolute weight/weight ratio of ethylene ($C_2$) uptake after 1 hour (h) to $C_2$ uptake after 0.1 hour ($C_2$(1 h)/$C_2$(0.1 h)). In some embodiments the attenuated hybrid catalyst may have a $C_2$(1 h)/$C_2$(0.1 h) ratio from 2.1 to 11, alternatively from 2.2 to 10.4, alternatively from 2.4 to 10.0, alternatively from 3 to 9.9. In some embodiments the faster-light-off hybrid catalyst is that made from any one of the hybrid precatalysts (1) to (2) described earlier.

In some embodiments the kinetics profile of the attenuated hybrid catalyst may be characterized as a relative $C_2$(1 h)/$C_2$(0.1 h) ratio of $C_2$(1 h)/$C_2$(0.1 h) ratio of the attenuated hybrid catalyst to the $C_2$(1 h)/$C_2$(0.1 h) ratio of the faster-light-off catalyst from which it was made when run under the same polymerization conditions according to the Light-Off Batch Reactor Test Method described later. The relative $C_2$(1 h)/$C_2$(0.1 h) ratio may be from 1.05 to 6, alternatively from 1.1 to 6, alternatively from 1.2 to 5.4, alternatively from 1.5 to 5.0.

An alternative or additional way of expressing the effective amount of the kinetics modifier compound (KMC) in relative terms of attenuated light-off performance, as measured by the Light-off Vial Test Method described later, may be a sufficient quantity of KMC such that the attenuated hybrid catalyst and the faster-light-off catalyst from which it is made may have light-off profiles as measured by the Light-Off Vial Test Method (described later) wherein the times of their respective peak polymerization temperatures $Temp_{peak}$ are at least 0.7 minute, alternatively greater than 1.0 minute, alternatively greater than 5 minutes, alternatively greater than 10.0 minutes, alternatively greater than 20.0 minutes, alternatively greater than 30.0 minutes, alternatively greater than 40.0 minutes, alternatively greater than 50.0 minutes of each other. The attenuated hybrid catalyst and the faster-light-off catalyst from which it is made may have light-off profiles as measured by the Light-Off Vial Test Method (described later) wherein the times of their respective peak polymerization temperatures $Temp_{peak}$ are within 60 minutes, alternatively within 45 minutes, alternatively within 30 minutes of each other. The effect of the kinetics modifier compound on delaying the time of peak polymerization temperature $Temp_{peak}$ for the attenuated hybrid catalyst relative to the time $Temp_{peak}$ of the of the faster-light-off hybrid catalyst from which it is made may differ depending upon (a) the attenuated hybrid catalyst's structural class (e.g., formula (Ia) or (Ib), or structural subclass (e.g., formula (Ia)-1 versus (Ia)-1a; or formula (Ia)-1 versus (Ib)-1 and/or (b) the structural class (e.g., acetylenes, allenes, or internal alkenes) or structural subclass (e.g., arylacetylenes versus alkylacetylenes; or monoacetylenes versus diacetylenes or triacetylenes; or acyclic allenes versus cycloalkylallenes versus vinylidene allenes; or aryl-type internal alkenes versus alkyl-type internal alkenes) of the kinetics modifier compound. In some aspects any one of the endpoints for a range of the time difference between the $Temp_{peak}$ of the attenuated hybrid catalyst and the $Temp_{peak}$ of the faster-light-off hybrid catalyst from which it is made may be based on the data given later in the Examples.

In some embodiments the kinetics profile of the attenuated hybrid catalyst may be characterized as a combination of any two, alternatively all but any one, alternatively each of the foregoing embodiments.

Comparative or non-inventive examples either do not contain any kinetics modifier compound or contain less than the effective amount of the kinetics modifier compound.

Catalyst activity. Catalyst activity of the attenuated hybrid catalyst (e.g., of formula (III)) is determined to be substantially the same as catalyst activity of the faster-light-off catalyst if the peak polymerization reaction temperature is reached ($Temp_{peak}$) in degrees Celsius (° C.) for the attenuated hybrid catalyst is within ±5° C., alternatively ±4° C., alternatively ±3° C., alternatively ±2° C., alternatively ±1° C. of the $T_p$ of the faster-light-off catalyst, as measured by the Light-Off Vial Test Method. Or catalyst activity is determined to be the catalyst's activity/polymerization productivity, expressed as number of grams dried polyolefin product made per gram of catalyst added to reactor-hour (gPE/gcat-hr), and all other things being equal may not be significantly less than, and in some embodiments may be more than, that of the faster-light-off hybrid catalyst.

The faster-light-off catalyst. Embodiments of the faster-light-off catalyst (e.g., of formula (II)) may be in need of attenuation of light-off kinetics for slurry-phase and/or gas-phase polymerization of 1-alkene monomer) for the reasons described above. The same or other embodiments of the faster-light-off catalyst (e.g., of formula (II)) may be in need of the ligand R for different reasons such as for altering solubility of the catalyst in alkane(s) solvent or for NMR studies of hybrid catalyst structures and improving catalyst structure design.

Anion $A^-$. The faster-light-off hybrid catalyst (e.g., of formula (II)) and the attenuated hybrid catalyst (e.g., of formula (III)) may each contain an anion $A^-$ derived from the activator used to make the faster-light-off hybrid catalyst from the hybrid precatalyst of formula (I) or derived from the leaving group X. The activator functions to activate the hybrid precatalyst of formula (I) by abstracting therefrom a leaving group X to give the faster-light-off hybrid catalyst (e.g., of formula (II)) and the anion $A^-$. The resulting activated hybrid catalyst, i.e., the faster-light-off hybrid catalyst of formula (II), is conventionally drawn showing the metal atom M with a positive charge. This positive charge indicates a catalytic site to which an olefin monomer may bond during a polymerization reaction. The anion $A^-$ formally balances the positive charge such that the faster-light-off hybrid catalyst (e.g., of formula (II)) and the attenuated hybrid catalyst (e.g., of formula (III)) made therefrom are overall neutral.

The nature of anion $A^-$ in the faster-light-off hybrid catalyst (e.g., of formula (II)) and the attenuated hybrid catalyst (e.g., of formula (III)) is not believed to be important. As mentioned, it may be an anionic derivative of X (i.e., $X^-$) or an anion derivative of the activator. When the activator is an alkylaluminoxane and anion $A^-$ is the anion derivative thereof, the anion $A^-$ may be an alkylaluminoxane anion; alternatively, when the activator is an organoborane compound and anion $A^-$ is the anion derivative thereof, the anion $A^-$ may be an organoborane anion; alternatively when the activator is an organoborate compound and anion $A^-$ is the anion derivative thereof, the anion $A^-$ an organoborate anion. The anion $A^-$ is formed during the activating step of aspect 1. It is believed that the anion $A^-$ in the faster-light-off hybrid catalyst (e.g., of formula (II)) is carried through the combining step such that the anion $A^-$ in attenuated hybrid catalyst (e.g., of formula (III)) may be the same as the anion $A^-$ in faster-light-off catalyst. Nevertheless, the anion $A^-$ in the attenuated hybrid catalyst (e.g., of formula (III)) may be the same as or different than the anion $A^-$ in the faster-light-off hybrid catalyst (e.g., of formula (II)). For example, the anion $A^-$ in the faster-light-off hybrid catalyst (e.g., of formula (II)) may be an anionic derivative of the activator, and the anion $A^-$ in the attenuated hybrid catalyst (e.g., of formula (III)) may be $X^-$.

Catalyst structures. Without being bound by theory it is believed that the molecular structure of the faster-light-off hybrid catalyst of formula (II) and the molecular structure of the attenuated hybrid catalyst of formula (III) may be determined by conventional analytical methods such as nuclear magnetic resonance (NMR) spectroscopy or gas chromatography/mass spectrometry (GC/MS). The structure of the ligand R in formula (III) may be determined by quenching an NMR sample of the attenuated post-metallocene catalyst of formula (III) with a protic solvent such as isopropanol, $CH_3OH$ or $H_2O$, a partially deuterated protic solvent such as isopropyl-OD, $CH_3OD$ or HDO, or a perdeuterated protic solvent, such as perdeuterated isopropanol $(CD_3)_2C(D)OD)$ perdeuterated methanol ($CD_3OD$) or $D_2O$, to give a by-product of formula H—R or D-R, and analyzing the structure of the by-product by NMR such as proton NMR ($^1$H-NMR) or gas chromatography/mass spectrometry (GC/MS).

Activating step. In some embodiments the method of making the attenuated hybrid catalyst (e.g., of formula (III)) further comprises the activating step as a preliminary step, which may be completed before start of the combining step. The activating step comprises contacting the precatalyst of formula (I) with the activator under the effective activating conditions that make the faster-light-off hybrid catalyst. The activating step may be performed in the absence of the kinetics modifier compound.

Activator. The activator for activating the hybrid precatalyst of formula (I) may be an alkylaluminoxane, an organoborane compound, an organoborate compound, or a trialkylaluminum compound. The activator may also be a combination of any two or more thereof. For example the activator may comprise an alkylaluminoxane and an organoborate compound such as a methylaluminoxane and an organoborate having CAS name Amines, bis(hydrogenated tallow alkyl)methyl, tetrakis(pentafluorophenyl)borate (Amines, bis(hydrogenated tallow alkyl)methyl, tetrakis (pentafluorophenyl)borate(1-)). The activator for activating a cyclopentadienyl-containing ligand-metal (Ti, Zr, or Hf) complex to give the metallocene catalyst may be the trialkylaluminum compound.

Alkylaluminoxane: also referred to as alkylalumoxane. A product of a partial hydrolysis of a trialkylaluminum compound. Embodiments may be a $(C_1$-$C_{10})$alkylaluminoxane, alternatively a $(C_1$-$C_6)$alkylaluminoxane, alternatively a $(C_1$-$C_4)$alkylaluminoxane, alternatively a $(C_1$-$C_3)$alkylaluminoxane, alternatively a $(C_1$-$C_2)$alkylaluminoxane, alternatively a methylaluminoxane (MAO), alternatively a modified-methylaluminoxane (MMAO). In some aspects the alkylaluminoxane is a MAO. In some embodiments the alkylaluminoxane is supported on untreated silica, such as fumed silica. The alkylaluminoxane may be obtained from a commercial supplier or prepared by any suitable method. Suitable methods for preparing alkylaluminoxanes are well-known. Examples of such preparation methods are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; and 5,693,838; and in European publications EP-A-0 561 476; EP-B1-0 279 586; and EP-A-0 594-218; and in PCT publication WO 94/10180.

The maximum amount of alkylalumoxane may be selected to be a 5,000-fold molar excess over the precatalyst based on the molar ratio of moles of Al metal atoms in the aluminoxane to moles of metal atoms M (e.g., Ti, Zr, or Hf) in the precatalyst. The minimum amount of activator-to-precatalyst may be a 1:1 molar ratio (Al/M). The maximum may be a molar ratio of Al/M of 150, alternatively 124.

The organoborane compound. A tri(fluoro-functional organo)borane compound ((fluoro-organo)$_3$B) such as tris (pentafluorophenyl)borane ($(C_6F_5)_3B$), tris[3,5-bis(trifluoromethyl)phenyl]borane ($(3,5$-$(CF_3)_2$—$C_6H_3)_3B$), or a mixture of any two or more thereof.

The organoborate compound. A tetra(fluoro-functional organo)borate compound((fluoro-organo)$_4$B) such as N,N-dimethylanilinium tetrakis(pentafluorophenyl)borate, triphenylcarbenium tetrakis(pentafluorophenyl)borate, N,N-dimethylanilinium tetrakis[3,5-bis(trifluoromethyl)phenyl] borate, or triphenylcarbenium tetrakis[3,5-bis (trifluoromethyl)phenyl]borate, or a mixture of any two or more thereof. The organoborate compound may be a methyldi($(C_{14}$-$C_{18})$alkyl)ammonium salt of tetrakis(pentafluorophenyl)borate, which may be obtained from Boulder Scientific or prepared by reaction of a long chain trialkylamine (Armeen™ M2HT, available from Akzo-Nobel, Inc.) with HCl and Li[B($C_6F_5$)$_4$]. Such a preparation is disclosed in U.S. Pat. No. 5,919,983, Ex. 2. The organoborate compound may be used herein without (further) purification. Also, Amines, bis(hydrogenated tallow alkyl)methyl, tetrakis (pentafluorophenyl)borate.

Trialkylaluminum compounds may be utilized as activators for precatalyst (metallocene precatalyst) or as scavengers to remove residual water from polymerization reactor prior to start-up thereof. Examples of suitable alkylaluminum compounds are trimethylaluminum, triethylaluminum, triisobutylaluminum, tri-n-hexylaluminum, and tri-n-octylaluminum.

The activator, also known as a cocatalyst, may affect the molecular weight, degree of branching, comonomer content, or other properties of the polyolefin polymer. The activator may enable coordination polymerization or cationic polymerization.

Without being bound by theory it is believed that the choice of activator used to activate the faster-light-off hybrid catalyst does not influence the structure of the attenuated hybrid catalyst made from the faster-light-off hybrid catalyst. That is, considering just the cation portion of formula (III) (i.e., ignoring the anion $A^-$), the structures of attenuated hybrid catalysts made using different activators are expected to be identical. The structures of unsupported attenuated hybrid catalysts may be easier to determine by NMR than those of supported attenuated hybrid catalysts due to the heterogeneous nature of the latter (typical support materials do not dissolve in NMR solvents).

In some embodiments the choice of $A^-$ may have additional effects on the kinetics profile of the attenuated hybrid catalyst. Any such effects of $A^-$, however, will not completely eliminate the beneficial effect(s) of the kinetics modifier compound on the kinetics profile of the attenuated hybrid catalyst.

Effective conditions. The reactions described herein (e.g., the combining step, the activating step, the polymerization) independently are conducted under circumstances that allow the intended reaction to proceed. Examples of effective conditions are reaction temperature, type of atmosphere (e.g., inert atmosphere), purity of reactants, stoichiometry of reactants, agitation/mixing of reactants, and reaction time period. Conditions effective for activating and polymerizing steps may be those described in the art and well-known to the ordinary skilled person. For example, activating effective conditions may comprise techniques for manipulating catalysts such as in-line mixers, catalyst preparation reactors, and polymerization reactors. The activation temperature may be from 20° to 800° C., alternatively from 300° to 650° C. The activation time may be from 10 seconds to 2 hours. Examples of gas-phase polymerizing conditions are described later herein. Effective conditions for the combining step used to make the attenuated hybrid catalyst may comprise a reaction temperature from −50° to 30° C., an inert atmosphere (e.g., nitrogen, helium, or argon gas free of water and $O_2$), reactants that are free of water and $O_2$ and having a purity from 90% to 100%, amounts of reactants for minimizing waste/maximizing product yield, stirring or mixing reactants, and a reaction time period from 1 minute to 24 hours.

Effective reaction conditions for making the hybrid precatalyst of formula (IV). Such conditions may comprise techniques for manipulating air-sensitive and/or moisture-sensitive reagents and reactants such as Schlenk-line techniques and an inert gas atmosphere (e.g., nitrogen, helium, or argon). Effective reaction conditions may also comprise a sufficient reaction time, a sufficient reaction temperature, and a sufficient reaction pressure. Each reaction temperature independently may be from −78° to 120° C., alternatively from −30° to 30° C. Each reaction pressure independently may be from 95 to 105 kPa, alternatively from 99 to 103 kPa. Progress of any particular reaction step may be monitored by analytical methods such as nuclear magnetic resonance (NMR) spectroscopy, mass spectrometry to determine a reaction time that is effective for maximizing yield of intended product. Alternatively, each reaction time independently may be from 30 minutes to 48 hours.

The hybrid precatalyst of formula (I). The precatalyst of formula (I) may be synthesized according to methods known in the art, including those methods referenced above. Alternatively, the hybrid precatalyst may be obtained from a precatalyst supplier such as Boulder Scientific.

Polyolefin polymer made by the method of polymerizing. When the 1-alkene monomer is the combination of ethylene and propylene, the polyolefin polymer made therefrom is an ethylene/propylene copolymer. When the 1-alkene monomer is ethylene alone, the polyolefin polymer made therefrom is a polyethylene homopolymer. When the 1-alkene monomer is the combination of ethylene and 1-butene, 1-hexene, or 1-octene, the polyolefin polymer made therefrom is a poly(ethylene-co-1-butene) copolymer, a poly(ethylene-co-1-hexene) copolymer, or a poly(ethylene-co-1-octene) copolymer. In some embodiments the polyolefin polymer made from the 1-alkene monomer is an ethylene-based polymer having from 50 to 100 weight percent (wt %) repeat units derived from ethylene and from 50 to 0 wt % repeat units derived from a 1-alkene monomer selected from propylene, 1-butene, 1-hexene, 1-octene, and the combination of any two or more thereof.

In some embodiments the polymerization method uses the 1-alkene monomer and a comonomer that is a diene monomer (e.g., 1,3-butadiene). When the 1-alkene monomer is a combination of ethylene and propylene and the polymerization also uses a diene monomer, the polyolefin polymer is an ethylene/propylene/diene monomer (EPDM) copolymer. The EPDM copolymer may be an ethylene/propylene/1,3-butadiene copolymer.

The multimodal (e.g., bimodal or trimodal) catalyst system. The bimodal catalyst system comprises the attenuated hybrid catalyst and at least one other olefin polymerization catalyst selected from a different attenuated hybrid catalyst, a hybrid catalyst, and a metallocene catalyst. The multimodal catalyst system makes in a single reactor a multimodal polyethylene composition comprising an HMW polyethylene component and an LMW polyethylene component. Some of the problems relate to unwanted gels in a post-reactor melt-blended multimodal (e.g., bimodal or trimodal) polyethylene composition. Other problems relate to transition complexity and stability of the multimodal (e.g., bimodal or trimodal) catalyst system. Even in the absence of gels, there may be problems due to variability in settling of different size catalyst particles. In some aspects variability in melt index (12) may be measured as a function of particle size instead of using gel measurements.

The method of making the attenuated hybrid catalyst may be performed in the presence of the metallocene catalyst or a metallocene precatalyst. When performed in the presence of the metallocene precatalyst, the method of activating the precatalyst of formula (I) with an activator further comprises activating the metallocene precatalyst with a same or different activator. Typically, the method of making the attenuated hybrid catalyst is performed in the absence of a metallocene (pre)catalyst.

The metallocene catalyst. The metallocene catalyst may be made from any one of the metallocene precatalyst components described in U.S. Pat. No. 7,873,112B2, column 11, line 17, to column 22, line 21. In some aspects the metallocene catalyst is made from a metallocene precatalyst species named in U.S. Pat. No. 7,873,112$B^2$, column 18, line 51, to column 22, line 5. In some aspects the metallocene precatalyst is selected from bis($\eta^5$-tetramethylcyclopentadienyl)zirconium dichloride; bis($\eta^5$-tetramethylcyclopentadienyl)zirconium dimethyl; bis($\eta^5$-pentamethylcyclopentadienyl)zirconium dichloride; bis($\eta^5$-pentamethylcyclopentadienyl)zirconium dimethyl; (1,3-dimethyl-4,5,6,7-tetrahydroindenyl)(1-methylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(n-propylcyclopentadienyl)hafnium dichloride; bis(n-propylcyclopentadienyl)hafnium dimethyl; bis(n-butylcyclopentadienyl)zirconium dichloride; (cyclopentadienyl)(1,5-dimethylindenyl)zirconium dimethyl; (methylcyclopentadienyl)(1,5-dimethylindenyl)zirconium dimethyl; (cyclopentadienyl)(1,4-dimethylindenyl)zirconium dimethyl; (methylcyclopentadienyl)(1,4-dimethylindenyl)zirconium dimethyl; and bis(n-butylcyclopentadienyl)zirconium dimethyl. In some aspects the metallocene catalyst is a product of an activation reaction of an activator and any one of the aforementioned metallocene precatalysts.

Unsupported or supported catalyst. The hybrid precatalyst of formula (I), the faster-light-off hybrid catalysts such as the faster-light-off catalyst of formula (II), the attenuated hybrid catalyst such as the attenuated hybrid catalyst of formula (III), and the multimodal catalyst system independently may be unsupported or disposed on a solid particulate support material. When the support material is absent, the hybrid precatalyst of formula (I), the faster-light-off hybrid catalysts such as the faster-light-off catalyst of formula (II), the attenuated hybrid catalyst such as the attenuated hybrid catalyst of formula (III), and/or the multimodal catalyst system may be injected into a slurry-phase or gas-phase polymerization reactor as a solution in a hydrocarbon solvent. When the hybrid precatalyst of formula (I), the faster-light-off hybrid catalysts such as the faster-light-off catalyst of formula (II), the attenuated hybrid catalyst such as the attenuated hybrid catalyst of formula (III), and/or the multimodal catalyst system is/are disposed on the support material, they may be injected into the slurry-phase or gas-phase polymerization reactor as a slurry suspended in the hydrocarbon solvent or as a dry, powder (i.e., dry particulate solid).

The faster-light-off hybrid catalyst (e.g., of formula (II)) and/or the attenuated hybrid catalyst (e.g., formula (III)) may be premade in the absence of the support material and later disposed onto the support material. Alternatively, the hybrid precatalyst of formula (I) or the faster-light-off hybrid catalyst (e.g., of formula (II)) may be disposed onto the support material, and then the faster-light-off hybrid catalyst (e.g., of formula (II)) and/or the attenuated hybrid catalyst (e.g., of formula (III)) may be made in situ on the support material.

The supported hybrid precatalyst of formula (I), the supported faster-light-off hybrid catalyst (e.g., supported catalyst of formula (II)) and/or the supported attenuated hybrid catalyst (e.g., supported catalyst of formula (III)) may be made by a concentrating method by evaporating a hydrocarbon solvent from a suspension or solution of the support material in a solution of the precatalyst of formula (I), the faster-light-off catalyst (e.g., of formula (II)) and/or the attenuated hybrid catalyst (e.g., of formula (III)) in the hydrocarbon solvent. Alternatively, the supported precatalyst of formula (I), the supported faster-light-off catalyst (e.g., supported catalyst of formula (II)) and/or the supported attenuated hybrid catalyst (e.g., supported catalyst of formula (III)) may be made by a spray-drying method by spray-drying the suspension or solution. In some embodiments, the spray-drying method is used.

The support material. The support material is a particulate solid that may be nonporous, semi-porous, or porous. A carrier material is a porous support material. Examples of support materials are talc, inorganic oxides, inorganic chloride, zeolites, clays, resins, and mixtures of any two or more thereof. Examples of suitable resins are polystyrene, functionalized or crosslinked organic supports, such as polystyrene divinyl benzene polyolefins. The support material independently may be an untreated silica, alternatively a calcined untreated silica, alternatively a hydrophobing agent-treated silica, alternatively a calcined and hydrophobing agent-treated silica. The hydrophobing agent may be dichlorodimethylsilane.

Inorganic oxide support materials include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material may have a surface area in the range of from about 10 $m^2/g$ to about 700 $m^2/g$, a pore volume in the range of from about 0.1 $cm^3/g$ to about 4.0 $cm^3/g$, and average particle size in the range of from about 5 microns to about 500 microns. The support material may be a silica (e.g., fumed silica), alumina, a clay, or talc. The fumed silica may be hydrophilic (untreated), alternatively hydrophobic (treated). In some aspects the support is a hydrophobic fumed silica, which may be prepared by treating an untreated fumed silica with a hydrophobing agent such as dimethyldichlorosilane, a polydimethylsiloxane fluid, or hexamethyldisilazane. In some aspects the treating agent is dimethyldichlorosilane. In one embodiment, the support is Cabosil™ TS-610.

One or more precatalysts and/or one or more activators may be deposited on, contacted with, vaporized with, bonded to, or incorporated within, adsorbed or absorbed in, or on, one or more support or carrier materials.

The metallocene precatalyst may be spray dried according to the general methods described in U.S. Pat. No. 5,648,310. The support used with the hybrid precatalyst may be functionalized, as generally described in EP 0 802 203, or at least one substituent or leaving group is selected as described in U.S. Pat. No. 5,688,880.

Solution phase polymerization and/or slurry phase polymerization of olefin monomer(s) are well-known. See for example U.S. Pat. No. 8,291,115B2.

Inert hydrocarbon solvent. An alkane, an arene, or an alkylarene (i.e., arylalkane). Examples of inert hydrocarbon solvents are alkanes such as mineral oil, pentanes, hexanes, heptanes, octanes, nonanes, decanes, undecanes, dodecanes, etc., and toluene, and xylenes. In one embodiment, the inert hydrocarbon solvent is an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. Additional examples of suitable alkanes include Isopar-C, Isopar-E, and mineral oil such as white mineral oil. In some aspects the inert hydrocarbon solvent is free of mineral oil. The inert hydrocarbon solvent may consist of one or more ($C_5$-$C_{12}$)alkanes.

Gas-phase polymerization (GPP). The polymerization uses a GPP reactor, such as a stirred-bed gas phase polymerization reactor (SB-GPP reactor) or a fluidized-bed gas-phase polymerization reactor (FB-GPP reactor). Such reactors and methods are generally well-known. For example, the FB-GPP reactor/method may be as described in any one of U.S. Pat. Nos. 3,709,853; 4,003,712; 4,011,382; 4,302,566; 4,543,399; 4,882,400; 5,352,749; 5,541,270; US 2018/0079836 A1; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421

Gas phase polymerization operating conditions are any variable or combination of variables that may affect a polymerization reaction in the GPP reactor or a composition or property of a polyolefin polymer composition product made thereby. The variables may include reactor design and size; precatalyst composition and amount; reactant composition and amount; molar ratio of two different reactants; presence or absence of feed gases such as $H_2$, molar ratio of feed gases versus reactants, absence or concentration of interfering materials (e.g., $H_2O$ and/or $O_2$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In a GPP method, control individual flow rates of ethylene ("$C_2$"), hydrogen ("$H_2$") and 1-hexene ("$C_6$" or "$C_x$" wherein x is 6) to maintain a fixed comonomer to ethylene monomer gas molar ratio or feed mass ratio ($C_x/C_2$, e.g., $C_6/C_2$) equal to a described value (e.g., 0.00560 or 0.00703), a constant hydrogen to ethylene gas molar ratio or feed mass ratio ("$H_2/C_2$") equal to a described value (e.g., 0.00229 or 0.00280), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.79 meter per second (m/sec) (1.6 to 2.6 feet per second (ft/sec)). Operate the FB-GPP reactor at a total pressure of about 2068 to about 2758 kilopascals (kPa) (about 300 to about 400 pounds per square inch-gauge (psig)) and at a described first reactor bed temperature RBT. Maintain the fluidized bed at a constant height by withdrawing a portion of the bed at a rate equal to the rate of production of particulate form of the polyolefin polymer composition, which production rate may be from 5,000 to 150,000 kilograms per hour (kg/hour). Remove the product polyolefin polymer composition semi-continuously via a series of valves into a fixed volume chamber, wherein this removed multimodal (e.g., bimodal or trimodal) ethylene-co-1-hexene copolymer composition is purged to remove entrained hydrocarbons and treated with a stream of humidified nitrogen ($N_2$) gas to deactivate any trace quantities of residual catalyst.

The catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Induced condensing agent (ICA). An inert liquid useful for cooling materials in GPP reactor(s). Its use is optional. The ICA may be a ($C_3$-$C_{20}$)alkane, alternatively a ($C_5$-$C_{20}$) alkane, e.g., 2-methylbutane (i.e., isopentane). See U.S. Pat. Nos. 4,453,399; 4,588,790; 4,994,534; 5,352,749; 5,462,999; and 6,489,408. ICA concentration in reactor may be from 0.1 to 25 mol %, alternatively from 1 to 16 mol %, alternatively from 1 to 10 mol %.

The GPP conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. GPP may be operated free of (not deliberately added) scavenging agents. The GPP reactor/method may further include an amount (e.g., 0.5 to 200 ppm based on all feeds into reactor) of one or more static control agents and/or one or more a continuity additives such as aluminum stearate or polyethyleneimine. The static control agent(s) may be added to the FB-GPP reactor to inhibit formation or buildup of static charge therein.

The GPP reactor may be a commercial scale FB-GPP reactor such as a UNIPOL™ reactor or UNIPOL™ reactor, which are available from Univation Technologies, LLC, a subsidiary of The Dow Chemical Company, Midland, Michigan, USA.

1-Alkene monomer. The 1-alkene monomer is a compound of formula $H_2C{=}C(H)(CH_2)_nR^8$, wherein subscript n is an integer from 0 to 19 and group $R^8$ is H or $CH_3$. Examples are ethylene (subscript n is 0 and $R^8$ is H), propylene (subscript n is 0 and $R^8$ is $CH_3$), and a ($C_4$-$C_{20}$) alpha-olefin (subscript n is an integer from 1 to 19 and $R^8$ is H or $CH_3$. In some embodiments the 1-alkene monomer is ethylene, propylene, 1-butene, 1-hexene, 1-octene, or a combination of any two or more thereof. In some embodiments the 1-alkene monomer is a combination of ethylene and propylene. In other embodiments the 1-alkene monomer is ethylene alone or a combination of ethylene and 1-butene, 1-hexene, or 1-octene.

Polyolefin polymer. A product of polymerizing at least one 1-alkene monomer with the attenuated hybrid catalyst or the multimodal catalyst system. A macromolecule, or collection of macromolecules, having constitutional units derived from the at least one 1-alkene monomer. For example, when the at least one 1-alkene monomer consists of ethylene, the polyolefin polymer consists of a polyethylene homopolymer. When the at least one 1-alkene monomer consists of ethylene and propylene, the polyolefin polymer consists of an ethylene/propylene copolymer. When the at least one 1-alkene monomer consists of ethylene and a comonomer selected from 1-butene, 1-hexene, and 1-octene, the polyolefin polymer is selected from a poly(ethylene-co-1-butene) copolymer, a poly(ethylene-co-1-hexene) copolymer, and a poly(ethylene-co-1-octene) copolymer, respectively.

The polyolefin polymer may be a homopolymer or a copolymer. The polyolefin polymer may have a monomodal molecular weight distribution or a multimodal molecular weight distribution. The polyolefin polymer made from the multimodal catalyst system has a multimodal (e.g., bimodal or trimodal) molecular weight distribution and comprises a higher molecular weight (HMW) polyolefin polymer component and a lower molecular weight (LMW) polyolefin polymer component. The HMW polyolefin polymer component may be made by the attenuated hybrid catalyst (e.g., of formula (III) thereof and the LMW polyolefin polymer component may be made by the metallocene catalyst thereof.

Any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., Zr required by a zirconium compound, or C and H required by a polyethylene, or C, H, and O required by an alcohol) are not counted.

Alternatively precedes a distinct embodiment. ASTM is the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 230±1° C.

Unless stated otherwise, definitions of terms used herein are taken from the IUPAC Compendium of Chemical Technology ("Gold Book") version 2.3.3 dated Feb. 24, 2014. Some definitions are given below for convenience.

Alkane(s) (solvent). One or more acyclic, straight chain or branched chain compounds of formula $C_nH_{2n+2}$ and/or one or more cyclic compounds of formula $C_mH_{2m}$, wherein subscripts n and m independently are an integer from 5 to 50 (e.g., 6). Free of a carbon-carbon double bond (C═C) and a terminal carbon-carbon triple bond (C≡C).

Alkyl (unsubstituted). A monovalent group consisting of hydrogen atoms and at least one carbon atom and formally made by removing a hydrogen atom from an alkane. Free of a carbon-carbon double bond (C═C) and a terminal carbon-carbon triple bond (C≡C).

Alkyl (substituted). A monovalent group formally made by replacing at least one hydrogen atom of an unsubstituted alkyl with a substituent group (e.g., $R^S$).

Alkaryl (unsubstituted) or alkyl-substituted aryl. A monovalent group consisting of hydrogen atoms and at least seven carbon atoms and formally made by removing a hydrogen atom from the arenyl portion of an alkyl-arene. E.g., 4-methylphenyl.

Alkaryl (substituted) or alkyl-substituted aryl. A monovalent group formally made by replacing at least one hydrogen atom of an unsubstituted alkaryl with a substituent group (e.g., $R^S$).

Aralkyl (unsubstituted). A monovalent group consisting of hydrogen atoms and at least seven carbon atoms and formally made by removing a hydrogen atom from the alkane portion of an arenyl-alkane. E.g., benzyl. Free of a carbon-carbon double bond (C═C) and a terminal carbon-carbon triple bond (C≡C).

Aralkyl (substituted). A monovalent group formally made by replacing at least one hydrogen atom of an unsubstituted aralkyl with a substituent group (e.g., $R^S$).

Aryl (unsubstituted). A monovalent group consisting of hydrogen atoms and at least six carbon atoms and formally made by removing a hydrogen atom from an arene. E.g., phenyl, naphthyl. Free of a carbon-carbon double bond (C═C) and a terminal carbon-carbon triple bond (C≡C).

Aryl (substituted). A monovalent group formally made by replacing at least one hydrogen atom of an unsubstituted aryl with a substituent group (e.g., $R^S$).

4-($C_1$-$C_{20}$)alkyl-substituted 1,3-butadiene molecule. A compound of formula $H_2C{=}C(H){-}C(H){=}C(H){-}(C_1\text{-}C_{20})$alkyl.

($C_\#$-$C_\#$) (as modifying a functional group). The # or number sign indicates a range of carbon atoms in an unsubstituted version of the functional group. For example, ($C_1$-$C_6$) has from 1 to 6 carbon atoms, ($C_7$-$C_{20}$) has from 7 to 20 carbon atoms, ($C_6$-$C_{12}$) has from 6 to 12 carbon atoms, and ($C_1$-$C_{20}$) has from 1 to 20 carbon atoms.

—C(═O)—O-(unsubstituted $C_1$-$C_{20}$)hydrocarbyl). A monovalent group consisting of hydrogen atoms, two oxygen atoms, and from 2 to 21 carbon atoms and formally made by removing a hydrogen atom from the carbonyl carbon atom of a formic acid ester. E.g., —C(═O)—O-phenyl or —C(═O)—O-ethyl. Free of a carbon-carbon double bond (C═C) and a terminal carbon-carbon triple bond (C≡C).

Coordination entity. An assembly consisting of a central atom (metal atom) to which is attached (bonded) to a surrounding array of other groups of atoms (ligand(s)).

Coordination number. For a specified atom (e.g., M) in a chemical species, the quantity of other atoms directly linked or bonded to the specified atom in the chemical species. For example, in titanium tetrachloride, the coordination number of the titanium atom is 4.

Denticity. In a coordination entity the number kappa (κ) of donor groups from the same ligand attached to the same central atom (e.g., attached to M).

Didentate organoheteryl. A monovalent group that functions as a ligand to metal M and that consists of carbon atoms, hydrogen atoms and at least one heteroatom selected from N, O, S, and P and may be chosen such that the monovalent group is doubly coordinated to metal M via a carbon atom and one such heteroatom or via two such heteroatoms. The monovalent ligand may provide to M a denticity, κ, of 2. The didentate organoheteryl may be free of a terminal carbon-carbon double bond (>C═$CH_2$) and a terminal carbon-carbon triple bond (—C═CH); alternatively free of any carbon-carbon double bond (C═C) and any terminal carbon-carbon triple bond (C≡C).

Didentate organoheterylene. A divalent group that functions as a ligand to metal atom M and that consists of carbon atoms, hydrogen atoms and at least one heteroatom selected from N, O, S, and P and may be chosen such that the divalent group is doubly coordinated to metal M via a carbon atom and one such heteroatom or via two such heteroatoms. The divalent group may provide to M a denticity, κ, of 2. The didentate organoheterylene may be free of a terminal carbon-carbon double bond (>C═$CH_2$) and a terminal carbon-carbon triple bond (—C═CH); alternatively free of any carbon-carbon double bond (C═C) and any terminal carbon-carbon triple bond (C≡C).

Dry. Generally, a moisture content from 0 to less than 5 parts per million based on total parts by weight. Materials fed to the reactor(s) during a polymerization reaction are dry.

Effective amount. A quantity sufficient to achieve a result.

Halogen atom. An atom selected from F, Cl, Br, and I; alternatively from F, Cl, and Br; alternatively from F and Cl; alternatively from F and Br; alternatively from Cl and Br; alternatively from F; alternatively from Cl.

Hapticity. In a coordination entity, the number, eta (q), of atoms in a continuous or uninterrupted series of two or more atoms from a same ligand attached to a central atom (e.g., M). For example, a cyclopentadienyl group has five continuous or uninterrupted carbon atoms coordinated to M and thus may have a hapticity, η, of 5 (eta$^5$ ("$\eta^5$")). The 4-($C_1$-$C_{20}$)alkyl-substituted 1,3-butadiene molecule is capable of coordinating to M via one of its two carbon-carbon double bonds and may provide to M a hapticity, η, of 2 (eta$^2$ ("$\eta^2$")) or via both of its carbon-carbon double bonds and may provide to M a hapticity, η, of 4 (eta$^4$ ("$\eta^4$")).

Heterohydrocarbyl. A monovalent group consisting of carbon atoms, hydrogen atoms and at least one heteroatom selected from N, O, S, Si, and P and is thus organic, but having its free valence a carbon atom. The heterohydrocarbyl may be free of a terminal carbon-carbon double bond (>C═$CH_2$) and a terminal carbon-carbon triple bond (—C═CH); alternatively free of any carbon-carbon double bond (C═C) and any terminal carbon-carbon triple bond (C≡C). In some embodiments the at least one heteroatom is selected from the group consisting of: N, O, and Si; alternatively N and O; alternatively N and Si; alternatively O and Si; alternatively N; alternatively O; alternatively Si; alternatively S; alternatively P. In some embodiments R-type groups are not a heterohydrocarbyl group.

Higher molecular weight (HMW) component. A subgroup of macromolecules having a peak in the GPC plot of dW/d Log(MW) on the y-axis versus Log(MW) on the x-axis that is at a higher molecular weight.

Hydrocarbyl. A monovalent group formally derived by removing an H atom from a carbon atom of a hydrocarbon compound consisting of C and H atoms. In some embodiments each hydrocarbyl independently is alkyl, alkaryl, aryl, or aralkyl.

Hydrocarbylene. A divalent group formally derived by removing two H atoms from different carbon atoms of a hydrocarbon compound consisting of C and H atoms.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Inert Hydrocarbon solvent. A liquid material at 25° C. that consists of carbon and hydrogen atoms, and optionally one or more halogen atoms, and is free of carbon-carbon double bonds and carbon-carbon triple bonds.

Leaving group. A group X that is coordinated to metal M in a precatalyst (M-X) and upon contact of the precatalyst with an activator one such group is removed from the precatalyst to convert the precatalyst to an active catalyst ($M^+$) and a by-product anion $X^-$. In some aspects the aforementioned $A^-$ in the faster light-off catalyst and the attenuated-light-off catalyst may be $X^-$. Each monodentate X is a leaving group that may provide to M a denticity, κ, of 1.

Ligand. A molecule or radical derived therefrom by removal of a hydrogen atom that is capable of coordinating to a transition metal atom M such as a Group 4 metal atom Ti, Hf, or Zr.

Ligands Cp and L are distinct from leaving groups X in that ligands Cp and L, if any, remain(s) coordinated to metal atom M in the precatalyst, in the faster-light-off catalyst made from the precatalyst, and in the attenuated hybrid catalyst made from the faster-light-off catalyst, whereas at least one leaving group X that is present in the precatalyst is absent in the faster-light-off catalyst, and at least one leaving group X that is present in the faster-light-off catalyst is replaced by attenuated-leaving group R in the attenuated hybrid catalyst.

Lower molecular weight (LMW) component. A subgroup of macromolecules having a peak in the GPC plot of dW/d Log(MW) on the y-axis versus Log(MW) on the x-axis that is at a lower molecular weight.

Metallocene catalyst. Homogeneous or heterogeneous material that enhances olefin polymerization reaction rates and contains a ligand-metal complex having two (substituted or unsubstituted)-cyclopentadienyl groups (unbridged or bridged). Substantially single site or dual site. Each metal is a transition metal Ti, Zr, or Hf.

Minute (one). Unit of time equal to 60.0 seconds. 0.1 minute equals 6.0 seconds.

Organoheteryl. A monovalent group consisting of carbon atoms, hydrogen atoms and at least one heteroatom selected from N, O, S, and P and is thus organic, but having its free valence on one of the heteroatom(s). The organoheteryl may be free of a terminal carbon-carbon double bond (>C═$CH_2$) and a terminal carbon-carbon triple bond (—C═CH); alternatively free of any carbon-carbon double bond (C═C) and any terminal carbon-carbon triple bond (C≡C).

Organoheterylene. A divalent group consisting of carbon atoms, hydrogen atoms and at least one heteroatom selected from N, O, S, and P and is thus organic, but having one its two free valences on one of the heteroatom(s) and having the other free valence on a carbon atom or a different heteroatom. The organoheterylene may be free of a terminal carbon-carbon double bond (>C═$CH_2$) and a terminal carbon-carbon triple bond (—C═CH); alternatively free of any carbon-carbon double bond (C═C) and any terminal carbon-carbon triple bond (C≡C).

Post-metallocene catalyst. Homogeneous or heterogeneous ligand-metal complex that is not a metallocene catalyst and not the hybrid catalyst. A non-metallocene molecular catalyst. The post-metallocene catalyst lacks a (substituted or unsubstituted)-cyclopentadienyl group-containing ligand and enhances olefin polymerization reaction rates. Substantially single site or dual site catalyst. Made by activating a post-metallocene precatalyst, which also lacks a (substituted or unsubstituted)-cyclopentadienyl ligand. Each metal is a transition metal Ti, Zr, or Hf.

Precatalyst (in reference to hybrid precatalyst). An unactivated coordination entity or ligand-metal complex that contains only one (substituted or unsubstituted)-cyclopentadienyl group-containing ligand.

R-type group. A group in a structural formula written as "R" or "$R^{Superscript}$" wherein the "superscript" is a number, letter, or both. Examples of "$R^{Superscript}$" groups are $R^1$, $R^{a1}$, $R^{a2}$, $R^{b1}$, and the like, respectively.

Tri(($C_1$-$C_{20}$)hydrocarbyl)silyl. A monovalent group consisting of a silicon atom bonded to three independently selected ($C_1$-$C_{20}$)hydrocarbyl groups and having its free valency on the silicon atom.

Unsubstituted ($C_1$-$C_5$)alkyl. An alkyl group selected from the group consisting of methyl, ethyl, a propyl, a butyl, and a pentyl. The propyl may be n-propyl or 1-methylethyl. The butyl may be n-butyl; 1-methylpropyl; 2-methylpropyl; or 1,1-dimethylethyl. The pentyl may be n-pentyl; 1, -methylbutyl; 2-methylbutyl; 3-methylbutyl; 1,1-dimethylpropyl; 2,2-dimethylpropyl; or 2,3-dimethylpropyl.

Ziegler-Natta catalyst. Heterogeneous material that enhances olefin polymerization reaction rates and is prepared by contacting an inorganic titanium compound, such as a titanium halide, which is supported on a magnesium halide support (e.g., a magnesium chloride support), with an activator.

Examples

Activator 1 (also called Cocatalyst 1): Amines, bis(hydrogenated tallow alkyl)methyl, tetrakis(pentafluorophenyl) borate(1-).

Mineral oil: HYDROBRITE 380 PO White mineral oil from Sonneborn.

Preparation 1A: preparation of an activator formulation comprising spray-dried methylaluminoxane/treated fumed silica (SDMAO) in hexanes/mineral oil. Slurry 1.6 kg of treated fumed silica (CABOSIL TS-610) in 16.8 kg of toluene, then add a 10 wt % solution (11.6 kg) MAO in toluene to give a mixture. Using a spray dryer set at 160° C. and with an outlet temperature at 70° to 80° C., introduce the mixture into an atomizing device of the spray dryer to produce droplets of the mixture, which are then contacted with a hot nitrogen gas stream to evaporate the liquid from the mixture to give a powder. Separate the powder from the gas mixture in a cyclone separator, and discharge the separated powder into a container to give the SDMAO as a fine powder.

Preparation 1 B: preparation of a slurry of the activator formulation of Preparation 1A. Slurry the SDMAO powder of Preparation 1A in a mixture of 10 wt % n-hexane and 78 wt % mineral oil to give the activator formulation having 12 wt % SDMAO/treated fumed silica solids in the hexane/ mineral oil.

Preparation 2: preparation of a spray-dried metallocene with activator formulation. Replicate Preparations 1A and 1 B except prepare an activator formulation by slurrying 1.5 kg of treated fumed silica (CABOSIL TS-610) in 16.8 kg of toluene, followed by adding a 10 wt % solution (11.1 kg) of MAO in toluene and (MeCp)(1,3-dimethyl-4,5,6,7-tetrahydroindenyl)$ZrMe_2$, wherein Me is methyl, Cp is cyclopentadienyl, and MeCp is methylcyclopentadienyl, in an amount sufficient to provide a loading of 40 micromoles Zr per gram of solid. Slurry the resultant powder to give an activator formulation of 22 wt % solids in 10 wt % isoparaffin fluid and 68 wt % mineral oil.

Preparation 2A: preparation of supported catalysts for use in the Light-Off Batch Reactor Test Method described later. In a nitrogen-purged glove box, in an oven-dried glass bottle, slurry 2.65 g of Cabosil TS-610 fumed silica in 62.5 g of toluene until well dispersed. Then add 22 grams (g) of a 10 weight percent (wt %) solution of methylaluminoxane (MAO) in toluene. Stir the mixture for 15 minutes, then add the hybrid precatalyst (e.g., any one of PreCat1 to PreCat2 described earlier) and any one of Kinetics Modifier Compounds KMC1 to KMC20 described earlier. Stir the resulting mixture for 30 to 60 minutes. Spray-dry the stirred mixture using a Büchi Mini Spray Dryer B-290 with the following parameters to yield the dried sample: Set Temperature is 185° C., Outlet Temperature is 100° C., Aspirator is 95%, and Pump Speed is 150 rotations per minute (rpm).

Faster-Light-Off Hybrid Catalysts: made under an inert $N_2$ atmosphere in a glovebox by charging a 40 milliliters (mL) glass vial containing a poly(tetrafluoroethylene) (PTFE)-coated magnetic stir bar and capped with a rubber septum with 200 milligrams (mg) of spray-dried methylaluminoxane (SDMAO, prepared according to Preparation 1A). Then add a slurry of 10 micromoles (μmol) of the hybrid precatalyst (e.g., any one of PreCat1 to PreCat2) in 0.2 mL of mineral oil. Stir the resulting mixture for 5 minutes to give a mineral oil slurry of the respective faster-light-off hybrid catalyst supported on treated fumed silica. Replicate this procedure to make multiple lots of the mineral oil slurry of faster-light-off hybrid catalysts, each supported on separate treated fumed silica. The hybrid catalyst may be made to have a molar ratio of aluminum to metal atoms (Al/M) of 120. The foregoing procedure is generally used to make catalysts for use in the Light-off Vial Test Method described later.

Attenuated hybrid catalysts: in separate runs, to an amount of the slurry to contain 10 μmol of Faster-Light-Off Catalyst (1) or (2) supported on treated fumed silica, add a solution of 10 μmol of the Kinetics Modifier Compound (8), (3), or (15) in 0.20 mL of toluene. Stir the resulting mixture for 5 minutes to give a mineral oil/toluene slurry of the attenuated hybrid catalysts supported on treated fumed silica having KMC (8), (3), or (15) respectively.

Light-off Vial Test Method: add a mineral oil slurry of a faster-light-off catalyst supported on treated fumed silica or a mineral oil/toluene slurry of an attenuated post-metallocene catalyst supported on treated fumed silica into a dried 40 mL glass vial. To the vial add 5.5 mL or 11 mL of 1-octene, and seal the vial with a septum cap. Record addition time as $T_0$ (0.00 minute). Manually shake (not stir) the vials to prevent clumping. Then place the shaken vials in different wells of a foam block sitting on a hotplate/stirrer. Immediately insert thermocouples through the septa caps into the vials below the liquid level therein, and record temperatures (° C.) of the contents of the vials at 5 seconds intervals from $T_0$ to 300 minutes past $T_0$. Download the temperature and time data to a spreadsheet, and plot thermokinetic profiles for analysis. The results of these runs may be depicted graphically as a plot of reaction temperature of the batch reactor contents on the y-axis versus time starting from addition of $Time_0$ on the x-axis.

Inventive Examples ("IE") and Comparative Examples ("CE") made by the Light-Off Vial Test Method. Combined effective amounts of certain kinetics modifier compounds ("KMC") with certain faster-light-off hybrid catalysts to give inventive examples of attenuated hybrid catalysts. Comparative examples meet one of three criteria (1) to (3): (1) contain a hybrid catalyst but do not contain a kinetics modifier compound, (2) contain a hybrid catalyst but contain less than an effective amount of a kinetics modifier compound (e.g., CE1a), or (3) contain a metallocene catalyst and a kinetics modifier compound. Tested the light-off effects with polyoctene of the faster-light-off hybrids and the inventive examples according to the Light-Off Vial Test Method tests to compare their relative activities. In separate vials, premix for 10 minutes (a) a mineral oil that is free of 1-octene, (b) an example of a hybrid precatalyst, and (c) a spray-dried methylaluminoxane (SDMAO) without a kinetics modifier compound to give a slurry of the faster-light-off hybrid catalyst that is free of 1-octene and kinetics modifier compound. In other vials premix for 10 minutes (a) mineral oil that is free of 1-octene, (b) the hybrid precatalyst, (c) the SDMAO, and (d) a kinetics modifier compound to give a slurry of the attenuated hybrid catalyst that is free of 1-octene. After 10 minutes of premixing (time in all Conditions except (B)*), add to each vial a same quantity of 1-octene. After the addition of 1-octene, observe a 5° to 120° C. increase, alternatively 10° to 110° C. increase, alternatively an increase in any temperature decade thereof (e.g., 10° to 20° C., 20° to 30° C. 30° to 40° C., 40° to 50° C., 50° to 60° C., 60° to 70° C., 70° to 80° C., 80° to 90° C., 90° to 100° C., 100° to 110° C., 110° to 120° C.) in temperature of the mixtures as evidence of activation of the respective catalyst. One of four sets of conditions is used: Conditions (A) (used in Tables 1 to 4): 5.5 mL Isopar-E; 8 μmol M; amount of SDMAO is quantity to give molar ratio Al/M=120; 0 μmol (CE) or 2 μmol (IE) kinetics modifier compound; 11 mL 1-octene; Conditions (B) (used in Table 5): 5.5 mL Isopar-E; 10 μmol M; amount of SDMAO is quantity to give molar ratio Al/M=120; 0 μmol (CE) or 2 μmol (IE) kinetics modifier compound; 5.5 mL 1-octene, wherein premixing is for 5 minutes instead of the 10 minutes*; Conditions (C) (used in Table 6): 5.5 mL Isopar-E; 20 μmol M; amount of SDMAO to give molar ratio Al/M=120; amount of kinetics modifier compound is 0 μmol (CE) or quantity to give indicated molar ratio M/KMC (IE); 5.5 mL 1-octene; Conditions (D) (used in Table 7): 5.5 mL Isopar-E; 2 μmol M; amount of SDMAO to give molar ratio Al/M=120; amount of kinetics modifier compound is 0 μmol (CE) or quantity to give indicated molar ratio M/KMC (IE); 5.5 mL 1-octene.

TABLE 1

(Prophetic) Expected Results of Light-Off Vial Test Method Performed using Conditions (A) and precatalyst (1) of formula

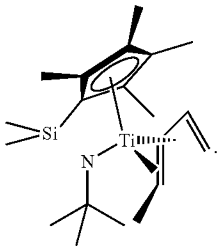

| Ex. No. | Catalyst | KMC | M/KMC (mol/mol) | Time from add 1-octene ($Time_0$) to Peak Temperature ($Time_{peakT}$) (minutes) |
|---|---|---|---|---|
| CE1 | Faster-Light-Off Catalyst (1) | None | 1.0/0.0 | 1.6 (No KMC) |
| IE1a | Attenuated-Light-Off Catalyst (1a) | KMC1 | 1.0/1.0 | ≥2.5 (KMC = phenylacetylene; comparative) |
| IE1b | Attenuated-Light-Off Catalyst (1b) | KMC15 | 1.0/1.0 | ≥2.5 (KMC = cyclohexylallene; comparative) |
| IE1c | Attenuated-Light-Off Catalyst (1c) | KMC1 | 1.0/5.0 | ≥2.5 (KMC = phenylacetylene; inventive) |

TABLE 2

(Prophetic) Expected Results of Light-Off Vial Test Method Performed using Conditions (A) and precatalyst (2) of formula

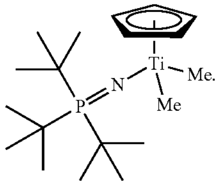

| Ex. No. | Catalyst | KMC | M/KMC (mol/mol) | Time from add 1-octene ($Time_0$) to Peak Temperature ($Time_{peakT}$) (minutes) |
|---|---|---|---|---|
| CE1 | Faster-Light-Off Catalyst (2) | None | 1.0/0.0 | 5 (No KMC; comparative) |
| IE2a | Attenuated-Light-Off Catalyst (2a) | KMC1 | 1.0/1.0 | ≥6 (KMC = phenylacetylene; inventive) |
| IE2b | Attenuated-Light-Off Catalyst (2b) | KMC15 | 1.0/1.0 | ≥6 (KMC = cyclohexylallene; inventive) |
| IE2c | Attenuated-Light-Off Catalyst (2c) | KMC1 | 1.0/5.0 | ≥6 (KMC = phenylacetylene; inventive) |

Inventive Examples (A1) to (A20) (IE(A1) to IE(A20)): (prophetic) separately prepare twenty attenuated hybrid catalysts according to Preparation 2A using PreCat1 and different ones of the Kinetics Modifier Compounds (1) to (20), respectively.

Inventive Examples (B1) to (B20) (IE(B1) to IE(B20)): (prophetic) separately prepare twenty attenuated hybrid catalysts according to Preparation 2A using PreCat2 and different ones of the Kinetics Modifier Compounds (1) to (20), respectively.

Light-Off Batch Reactor Test Method.

General. Observe relative kinetic profiles of faster-light-off catalysts and attenuated hybrid catalysts in separate polymerization runs each done in a 2-liter (L) semi-batch autoclave polymerization reactor equipped with a mechanical agitator. In the batch reactor, copolymerize ethylene and 1-hexene in the presence of hydrogen ($H_2$) in the gas phase. Analyze concentrations of ethylene ("$C_2$"), 1-hexene ("$C_6$"), and $H_2$ in the gas phase by mass spectrometry and gas chromatography. Add $C_6$ and $H_2$ components continuously throughout a 3-hour polymerization run to maintain their concentrations at steady state, but do not add more $C_2$. Measure ethylene uptake versus time to give relative representations of catalyst kinetic profiles.

Batch reactor drying and loading. Prior to each run, dry the batch reactor for 1 hour. Then charge the dried batch reactor with 200 g NaCl. Further dry the batch reactor by heating it and its contents for 30 minutes under $N_2$ atmosphere at 100° C. Then add 3 g of silica-supported methylaluminoxane (SMAO) to scavenge residuals, seal the batch reactor, and stir contents. Then charge the resulting dried batch reactor with 3.04 liters (L) of $H_2$ and 1-hexene so as to give a 1-hexene-to-ethylene ($C_6/C_2$) molar ratio of 0.004. Pressurize the batch reactor with ethylene to 1.52 megapascals (MPa). Allow the resulting system to reach steady state.

Then charge the batch reactor with a catalyst (a faster-light-off catalyst or an attenuated hybrid catalyst) to initiate polymerization. Record the time of addition of catalyst as Time zero ($Time_0$). Bring reactor temperature to 93° C. and maintain it at that temperature for from 1 to 5 hours. Cool the reactor down, vent, open, and wash the resulting polyolefin product with water, methanol, and dry it to give dried polyolefin product.

For each batch reactor run, calculate catalyst activity/polymerization productivity as number of grams dried polyolefin product made per gram of catalyst added to reactor-hour (gPE/gcat-hr). The higher the number of gPE/gcat-hr, the higher the catalyst activity/polymerization productivity. Record the amount of ethylene uptake after 0.1 hour ($C_2$ uptake 0.1 h) (6 minutes) and after 1.0 hour ($C_2$ uptake 1 h) (60 minutes), and report as a ratio of (C2 uptake 1 h)/(C2 uptake 0.1 h). All other things being equal, the greater the ratio of ($C_2$ uptake 1 hour)/($C_2$ uptake 0.1 hour), the more attenuated is catalyst light-off.

Determine melt temperature of the dried polyolefin product using differential scanning calorimetry (DSC) according to ASTM D3418-08 using a scan rate of 10° C. per minute on a 10 mg sample and using the second heating cycle. Some embodiments of the inventive polyolefin products made by the attenuated hybrid catalyst may have higher melting points than the melting points of comparative polyolefin products made by its corresponding faster-light-off catalyst.

From light-off batch reactor runs with faster-light-off catalysts, a majority of ethylene uptake may occur within the first few minutes from the start of the polymerization run (e.g., within 10 minutes of $Time_0$). In contrast with the attenuated hybrid catalysts, ethylene uptake is spread out more evenly throughout the 3-hour long polymerization runs. The results of these comparative and inventive runs may be depicted graphically as a plot of reaction temperature of the batch reactor contents on the y-axis, or ethylene monomer ("$C_2$") uptake on the y-axis, versus time starting from addition of $Time_0$ on the x-axis.

Comparative Examples Using Metallocene Precatalysts.

TABLE 3

Comparative polymerization actual Results of Light-Off Vial Test Method performed using Conditions (A) with the comparative metallocene precatalyst 1 ("MCN1") of formula

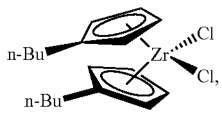
, wherein n-Bu is normal-butyl.

| Ex. No. | Pre-catalyst | KMC | M/KMC (mol/mol) | Light-Off Performance (Time from $Time_0$ to Peak Temperature (minutes)) |
|---|---|---|---|---|
| CE8 | MCN1 | None | 1.0/0.0 | 6.2 (No KMC; comparative) |
| CE8a | MCN1 | KMC1 | 1.0/1.0 | 6.7 (KMC = phenylacetylene; comparative) |

As shown in Table 3, the phenylacetylene had essentially no attenuating effect on the kinetics of comparative metallocene catalyst made from MCN1.

TABLE 4

Comparative polymerization actual results of Light-Off Batch Reactor Test Method performed using Conditions (A) with, with the comparative metallocene precatalyst 1 ("MCN1") of formula

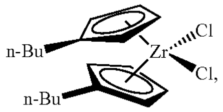

, wherein n-Bu is normal-butyl.

| Ex. No. | Pre-catalyst | KMC | M/KMC (mol/mol) | Cat. Charge (mg) | Dried Poly-olefin Product Yield (g) | Polymer-ization Productivity (gPE/gcat-hr) | Tpeak (° C.) | $C_2$ Up-take ratio (1 h/0.1 h) |
|---|---|---|---|---|---|---|---|---|
| CE9 | MCN1 | None | None | 10.3 | 240.4 | 23241 | 114.8 | 4.4 |
| CE9a | MCN1 | KMC8 | 1:1 | 10 | 238.5 | 23700 | 111.3 | 4.2 |

As shown in Table 4, the kinetics modifier compound had essentially no attenuating effect on the kinetics of comparative metallocene catalyst made from MCN1.

TABLE 5

Comparative polymerization actual results of Light-Off Batch Reactor Test Method performed using Conditions (A) with the comparative metallocene precatalyst 2 ("MCN2") of formula

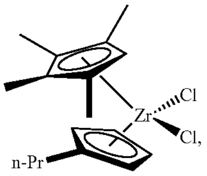

, wherein n-Pr is normal-propyl.

| Ex. No. | Pre-catalyst | KMC | M/KMC (mol/mol) | Cat. Charge (mg) | Dried Poly-olefin Product Yield (g) | Polymer-ization Productivity (gPE/gcat-hr) | Tpeak (° C.) | $C_2$ Up-take ratio (1 h/0.1 h) |
|---|---|---|---|---|---|---|---|---|
| CE10 | MCN2 | None | None | 5.5 | 67.8 | 11964 | 101.7 | 1.8 |
| CE10a | MCN2 | KMC1 | 1:1 | 5.4 | 46.7 | 9622 | 100.2 | 1.7 |
| CE10b | MCN2 | KMC8 | 1:1 | 5.3 | 56.1 | 10294 | 100.4 | 1.6 |

As shown in Table 5, the kinetics modifier compound worsened the polymerization productivity, and had essentially no attenuating effect on the catalytic activity, of the comparative metallocene catalyst made from MCN2.

TABLE 6

Comparative polymerization actual results of Light-Off Batch Reactor Test
Method performed using Conditions (A) with, comparative metallocene precatalyst 3 ("MCN3") of formula

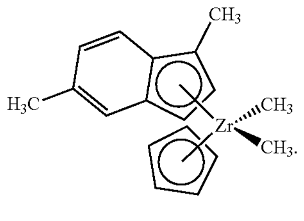

| Ex. No. | Pre-catalyst | KMC | M/KMC (mol/mol) | Cat. Charge (mg) | Dried Poly-olefin Product Yield (g) | Polymer-ization Productivity (gPE/gcat-hr) | Tpeak (° C.) | $C_2$ Up-take ratio (1 h/0.1 h) |
|---|---|---|---|---|---|---|---|---|
| CE11 | MCN3 | None | None | 3.4 | 70.5 | 20764 | 96.0 | 3.4 |
| CE11a | MCN3 | KMC8 | 1:1 | 3.3 | 81.5 | 24545 | 95.6 | 3.5 |

As shown in Table 6, the kinetics modifier compound had essentially no attenuating effect on the catalytic activity of the comparative metallocene catalyst made from MCN3.

The invention claimed is:

1. A method of making an attenuated hybrid catalyst, the method comprising combining a faster-light-off catalyst with an effective amount of a kinetics modifier compound ("KMC") of formula ($A^1$), ($B^1$), or ($C^1$): $R^5$—C≡C—$R^6$ ($A^1$), $(R^5)_2C$═C═$C(R^6)_2$ (B1), or $(R^5)(R^7)C$═$C(R^6)(R^7)$ ($C^1$) under effective reaction conditions to give an attenuated-light-off hybrid catalyst that exhibits an attenuated light-off kinetics profile (relative to that of the faster-light-off catalyst); wherein the faster-light-off catalyst has been made by activating a hybrid precatalyst of structural formula (I): $(Cp)(L)_kM(X)_x$ (I); wherein in formula ($A^1$), ($B^1$), or ($C^1$) each of $R^5$ and $R^6$ independently is H or $R^7$; and each $R^7$ independently is a ($C_1$-$C_{20}$)hydrocarbyl, —C(═O)—O-(unsubstituted $C_1$-$C_{20}$)hydrocarbyl), a ($C_1$-$C_{19}$)heterohydrocarbyl, or a tri(($C_1$-$C_{20}$)hydrocarbyl) silyl, or two $R^7$ are taken together to form a ($C_3$-$C_6$)alkylene; with the proviso that each $R^7$ lacks a carbon-carbon double bond; wherein each ($C_1$-$C_{20}$)hydrocarbyl independently is unsubstituted or substituted with from 1 to 4 substituent groups $R^S$; wherein each substituent group $R^S$ is independently selected from halogen, unsubstituted ($C_1$-$C_5$)alkyl, —C≡CH, —OH, ($C_1$-$C_5$)alkoxy, —C(═O)-(unsubstituted($C_1$-$C_5$)alkyl), —$NH_2$, —N(H)(unsubstituted ($C_1$-$C_5$)alkyl), —N(unsubstituted($C_1$-$C_5$)alkyl)$_2$, —COOH, —C(═O)—$NH_2$, —C(═O)—N(H)(unsubstituted ($C_1$-$C_5$ alkyl), —C(═O)—N(unsubstituted ($C_1$-$C_5$)alkyl)$_2$, —S-(unsubstituted ($C_1$-$C_5$)alkyl), —S(═O)$_2$-(unsubstituted ($C_1$-$C_5$)alkyl), —S(═O)$_2$—$NH_2$, —S(═O)$_2$—N(H)(unsubstituted ($C_1$-$C_5$)alkyl), —S(═O)$_2$—N(unsubstituted ($C_1$-$C_5$)alkyl)$_2$, —C(═)S-(unsubstituted ($C_1$-$C_5$)alkyl) and —COO(unsubstituted ($C_1$-$C_5$)alkyl); and wherein in formula (I): metal M is Ti, Hf, or Zr; subscript k is 0 or 1; subscript x is 1, 2, or 3; the Cp group is an unsubstituted cyclopentadienyl group; a hydrocarbyl-substituted cyclopentadienyl group; or an organoheterylene-substituted cyclopentadienyl group; group L is a monodentate organoheteryl group; each X is a monodentate group independently selected from a halogen atom, (($C_1$-$C_{20}$) alkyl)$_{3-g}$-(phenyl)$_g$Si— wherein subscript g is 0, 1, 2, or 3; $CH_3$, a ($C_2$-$C_{20}$)alkyl-$CH_2$, a ($C_6$-$C_{12}$)aryl-(($C_0$-$C_{10}$)alkylene)-$CH_2$, a ($C_1$-$C_6$)alkyl-substituted ($C_6$-$C_{12}$)aryl, a ($C_1$-$C_6$)alkoxy-substituted ($C_6$-$C_{12}$)aryl, a ($C_1$-$C_6$)alkoxy-substituted benzyl, and a ($C_1$-$C_6$)alkyl-substituted benzyl.

2. The method of claim 1 wherein the faster-light-off catalyst is of formula (II): $(Cp)(L)_kM(X)_{x-1}A^-$ (II), wherein subscripts k and x; metal M; and ligand L, and leaving group X are as defined for formula (I); and wherein the attenuated hybrid catalyst is of formula (III): $(Cp)(L)_kM(X)_{x-2}(R)A^-$ (III); wherein subscripts k and x; metal M; and ligand L are as defined for formula (I); each X is the monodentate group as defined for formula (I); wherein $A^-$ is an anion (used to formally balance the positive charge of metal M); and wherein R is a ligand of formula (A), (B), or (C): —C($R^5$)═C(X)$R^6$ (A), —C($R^5$)$_2$—C(X)═C($R^6$)$_2$ (B), or —C($R^5$)($R^7$)—C(X)($R^6$)($R^7$) (C), respectively; and wherein $R^5$ to $R^7$ are as defined previously for formula ($A^1$), ($B^1$), or ($C^1$) respectively.

3. The method of claim 1 wherein the hybrid precatalyst is of formula (Ia): $CpM(X)_x$ (Ia), wherein metal M is Ti, Hf, or Zr; subscript x is 1, 2 or 3; Cp is the organoheterylene-substituted cyclopentadienyl group; and each X is as defined for formula (I).

4. The method of claim 1 wherein the hybrid precatalyst of formula (I) is of formula (Ib): $(Cp)(L)M(X)_x$ (Ib); wherein M, L, X, and subscript x are as defined for formula (I); and Cp is the unsubstituted cyclopentadienyl group or hydrocarbyl-substituted cyclopentadienyl group.

5. The method of claim 1 wherein the kinetics modifier compound is of formula ($A^1$): $R^5$—C≡C—$R^6$ ($A^1$) that is selected from phenylacetylene; a (substituted-phenyl) acetylene; diphenylacetylene; a substituted diphenylacetylene; a cycloalkylacetylene; an acetylene of formula HC≡CSi (phenyl) h (($C_1$-$C_{20}$)alkyl)$_{3-h}$, wherein subscript h is an integer from 0 to 3; and an acetylene of formula HC≡C—$(CH_2)_mCH_3$, wherein subscript m is an integer from 1 to 15.

6. The method of claim 1 wherein the kinetics modifier compound is of formula ($B^1$) $(R^5)_2C$═C═$C(R^6)_2$ (B1) and is selected from a cycloalkylallene; an alkylallene; a dialkylallene; a trialkylallene; a trialkylsilylallene; a vinylidenecycloalkane; and an alkyl ester of an allenecarboxylic acid.

7. The method of claim 1 wherein the kinetics modifier compound is of formula ($C^1$) $(R^5)(R^7)C$═$C(R^6)(R^7)$ ($C^1$) and the kinetics modifier compound of formula ($C^1$) is an internal alkene.

8. The method of claim 1 wherein the method further comprises making a mixture of the attenuated hybrid catalyst, a support material, and an inert hydrocarbon solvent and removing the inert hydrocarbon solvent from the mixture so as to give the attenuated hybrid catalyst disposed on the support material.

9. The method of claim 1 wherein the hybrid precatalyst of formula (I) is of formula (Ia)-1

(Ia)-1

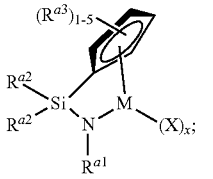

wherein each group $R^{a1}$ and $R^{a2}$ independently is a ($C_1$-$C_{20}$) alkyl; and each group $R^{a3}$ independently is H or a ($C_1$-$C_{20}$) alkyl; each subscript 1-5 independently is 0, 1, 2, 3, 4, or 5; and M, X, and subscript x are as defined for formula (I).

10. The method of claim 1 wherein the hybrid precatalyst is of formula (Ib)-1:

(Ib)-1

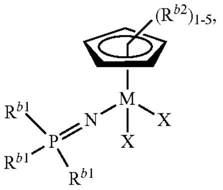

wherein each group $R^{b1}$ independently is a ($C_1$-$C_{20}$)alkyl; and each group $R^{b2}$ independently is H or a ($C_1$-$C_{20}$)alkyl; each subscript 1-5 independently is 0, 1, 2, 3, 4, or 5; and M and X are as defined for formula (I).

11. An attenuated hybrid catalyst made by the method of claim 1.

12. A method of feeding a hybrid catalyst to a slurry-phase or gas-phase polymerization reactor containing an olefin monomer and a moving bed of polyolefin polymer, the method comprising making the attenuated hybrid catalyst outside of the reactor and according to the method of claim 1, and feeding the attenuated hybrid catalyst in neat form or as a solution or slurry thereof in an inert hydrocarbon liquid through a feed line free of olefin monomer into the slurry-phase or gas-phase polymerization reactor.

13. A multimodal catalyst system comprising the attenuated hybrid catalyst of claim 11 and at least one second catalyst selected from the group consisting of an unattenuated a hybrid catalyst described herein, a different attenuated hybrid catalyst, a post-metallocene catalyst, and a metallocene catalyst.

14. A method of making a polyolefin polymer, the method comprising contacting at least one 1-alkene monomer with the attenuated hybrid catalyst made by the method of claim 1 under slurry-phase or gas-phase polymerization conditions in a slurry-phase or gas-phase polymerization reactor containing a moving bed of polyolefin resin, thereby making the polyolefin polymer.

* * * * *